(12) United States Patent
Morse et al.

(10) Patent No.: US 11,584,155 B2
(45) Date of Patent: Feb. 21, 2023

(54) COMPOSITE BICYCLE RIM

(71) Applicant: SRAM, LLC, Chicago, IL (US)

(72) Inventors: David Morse, Indianapolis, IN (US); Michael Hall, Indianapolis, IN (US); Ruan Trouw, Mooresville, IN (US)

(73) Assignee: SRAM, LLC, Chicago, IL (US)

(*) Notice: Subject to any disclaimer, the term of this patent is extended or adjusted under 35 U.S.C. 154(b) by 629 days.

(21) Appl. No.: 16/156,905

(22) Filed: Oct. 10, 2018

(65) Prior Publication Data
US 2020/0114680 A1    Apr. 16, 2020

(51) Int. Cl.
*B60B 5/02* (2006.01)
*B60B 1/00* (2006.01)
*B60B 1/02* (2006.01)
*B60B 21/00* (2006.01)

(52) U.S. Cl.
CPC ............ *B60B 5/02* (2013.01); *B60B 1/003* (2013.01); *B60B 1/02* (2013.01); *B60B 21/00* (2013.01)

(58) Field of Classification Search
CPC .. B60B 1/003; B60B 1/02; B60B 5/02; B60B 21/00
See application file for complete search history.

(56) References Cited

U.S. PATENT DOCUMENTS

| | | | | |
|---|---|---|---|---|
| 4,294,490 A | * | 10/1981 | Woelfel | B29C 53/60 301/64.703 |
| 4,514,013 A | * | 4/1985 | Woelfel | B29C 53/60 301/64.703 |
| 4,721,342 A | * | 1/1988 | Daniels | B29C 70/081 301/64.703 |
| 6,347,839 B1 | * | 2/2002 | Lew | B29C 70/345 301/95.102 |
| 6,761,847 B2 | | 7/2004 | Meggiolan | |
| 7,350,877 B1 | | 4/2008 | Muraoka et al. | |
| 7,377,595 B1 | * | 5/2008 | Okajima | B60B 21/023 301/58 |

(Continued)

FOREIGN PATENT DOCUMENTS

| | | |
|---|---|---|
| CN | 1298528 C | 2/2007 |
| CN | 101254733 B | 9/2012 |

(Continued)

OTHER PUBLICATIONS

Benedict, Tyler, "Velocite's new Venn Composite rims break the mold w/ filament wound, single strand carbon construction", bikerumor.com, Mar. 4, 2015, (7 pages).

*Primary Examiner* — Scott A Browne

(57) ABSTRACT

A rim for a bicycle wheel includes a radially inner portion disposed along an inner circumference of the rim. The rim also includes a first sidewall and a second sidewall spaced apart from the first sidewall. The first sidewall and the second sidewall extend radially outward from the radially inner portion. The first sidewall includes a layer of a composite material. The layer of the composite material includes fabric plies of the composite material that are shaped as strips. The composite material includes a matrix of a polymer-based material and fibers of a reinforcing material. The strips include a first strip and a second strip. The second strip is adjacent to the first strip within the layer of the composite material. The second strip is nonparallel to the first strip.

20 Claims, 13 Drawing Sheets

(56) References Cited

U.S. PATENT DOCUMENTS

| | | | |
|---|---|---|---|
| 7,926,884 B2 | 4/2011 | Heyse | |
| 8,905,491 B2 * | 12/2014 | Koshiyama | B60B 21/04 301/95.102 |
| 9,149,992 B2 | 10/2015 | Yu | |
| 10,532,610 B2 * | 1/2020 | Poertner | B60B 1/003 |
| 2012/0025597 A1 | 2/2012 | Shimano | |
| 2014/0346847 A1 * | 11/2014 | Werner | B60B 5/02 301/64.703 |
| 2014/0346849 A1 * | 11/2014 | Shiotani | B60B 21/062 301/95.102 |
| 2019/0308446 A1 * | 10/2019 | Morse | B60B 5/02 |
| 2020/0114679 A1 * | 4/2020 | Morse | B60B 1/003 |

FOREIGN PATENT DOCUMENTS

| | | | | |
|---|---|---|---|---|
| CN | 102666126 A | | 9/2012 | |
| CN | 203282953 U | | 11/2013 | |
| JP | S61244602 A | * | 10/1986 | B60B 5/00 |
| TW | 200838729 A | | 10/2008 | |
| TW | 201634243 A | | 10/2016 | |

\* cited by examiner

COMPOSITE BICYCLE RIM

1. FIELD OF THE DISCLOSURE

The present disclosure is generally directed to a bicycle rim, and more particularly, to a composite bicycle rim.

2. DESCRIPTION OF RELATED ART

A traditional bicycle wheel may include a rim formed of extruded metals or other materials that are bent and bonded into a circular shape having consistently shaped cross sections. Recently, other materials, such as fiber reinforced plastics, have been used in the manufacture of bicycle rims, which may be formed into circular shapes through non-extrusion based processes. Carbon fiber reinforced plastics may, for example, be used.

A method for manufacturing a fiber based, such as carbon fiber based, bike wheel relies on the stacking of individual sheets of carbon fiber material to form structures such as a side wall of the rim. The carbon fiber sheets may be pre-impregnated with a resin or other matrix material that undergoes a curing process to form the rim. The stacked layers of a sheet of carbon fiber typically include fibers oriented in different directions, respectively. At least some of the fibers of the stacked layers are oriented outside of a critical angle error, which reduces the ability of such fibers to support stresses and loads. The use of sheets of carbon fiber to manufacture a composite rim also results in a large amount of border scrap associated with cutting the sheets of carbon fiber to fit a shape of the composite rim, which increases the cost of manufacturing the rim.

SUMMARY

In one example, a rim for a bicycle wheel includes a radially inner portion disposed along an inner circumference of the rim, a first sidewall, and a second sidewall spaced apart from the first sidewall. The first sidewall and the second sidewall extend radially outward from the radially inner portion. The rim also includes a radially outer tire engaging portion disposed along an outer circumference of the rim. The radially outer tire engaging portion extends from the first sidewall and the second sidewall, respectively. The first sidewall includes a layer of a composite material. The layer of the composite material includes strips of the composite material. The composite material includes a matrix of a polymer-based material and fibers of a reinforcing material. The strips include a first strip and a second strip. The second strip is adjacent to the first strip within the layer of the composite material. The second strip is nonparallel to the first strip.

In one example, the polymer-based material is a plastic, an acrylic, a resin, an epoxy, or any combination thereof. The fibers of the reinforcing material are carbon fibers.

In one example, the fibers of each of the strips extend in a primary strength direction of the respective strip.

In one example, fiber orientation of the fibers of the respective strip is unidirectional in a direction along a length of the respective strip.

In one example, each of the strips has a length and a width. The width is perpendicular to the length. The width of each of the strips is between 10 millimeters and 30 millimeters.

In one example, the layer of the composite material is a first layer of the composite material, the fabric plies are first fabric plies, and the strips are first strips. The second sidewall includes a second layer of the composite material or another composite material. The second layer of the composite material or the other composite material includes second fabric plies that are shaped as second strips. The second strips include a third strip and a fourth strip adjacent to the third strip. The fourth strip is nonparallel to the third strip.

In one example, the first strip is longer than the second strip, is wider than the second strip, or is longer and wider than the second strip.

In one example, each of the strips is at a different angle relative to a tangent of the outer circumference of the rim.

In one example, the strips extend beyond the inner circumference, the outer circumference, or the inner circumference and the outer circumference.

In one example, the strips extend around the radially inner portion, such that the second sidewall includes portions of the strips, respectively.

In one example, the strips are fully contained within the first sidewall.

In one example, the layer of the composite material is a first layer of the composite material and the strips are first layer strips. Each of the first layer strips has a same first orientation angle between a radial reference line extending from a center of the rim to a centerline of the respective first layer strip, and the centerline of the respective first layer strip. The first sidewall further includes a second layer of the composite material. The second layer of the composite material includes second layer strips. Each of the second layer strips has a same second orientation angle between a radial reference line extending from the center of the rim to a centerline of the respective second layer strip, and the centerline of the respective second layer strip. The second orientation angle is different than the first orientation angle.

In one example, the first layer strips and the second layer strips are arranged about the center of the rim. Each of the first layer strips overlaps portions of at least two of the second layer strips, respectively, and each of the second layer strips overlaps a portion of at least one of the first layer strips, respectively.

In one example, the layer of the composite material is a first layer of material, and the strips are first layer strips. The first sidewall further includes a second layer of material. The second layer of material is a second composite material. The second layer of material includes second layer strips of the second composite material.

In one example, a rim formed of a cured composite material includes a radially inner portion disposed along an inner circumference of the rim, a first sidewall, and a second sidewall spaced apart from the first sidewall. The first sidewall and the second sidewall extend radially outward from the radially inner portion. The rim also includes a radially outer tire engaging portion disposed along an outer circumference of the rim, the radially outer tire engaging portion extending from the first sidewall and the second sidewall, respectively. The first sidewall includes a plurality of first strips of a composite material. The composite material includes a matrix of a polymer-based material and fibers of a reinforcing material. The fibers of each first strip of the plurality of first strips extend in a primary strength direction of the respective first strip. The second sidewall includes a plurality of second strips of the composite material. The fibers of each second strip of the plurality of second strips extend in a primary strength direction of the respective second strip.

In one example, each first strip of the plurality of first strips has a length in the primary strength direction of the respective first strip, and each second strip of the plurality of second strips has a length in the primary strength direction of the respective second strip. Each first strip of the plurality of first strips has a width perpendicular to a length of the respective first strip. The width of the respective first strip is between 10 millimeters and 30 millimeters. Each second strip of the plurality of second strips has a width perpendicular to a length of the respective second strip. The width of the respective second strip is between 10 millimeters and 30 millimeters.

In one example, a centerline of each first strip of the plurality of first strips is oriented at a first angle relative to a radial reference line extending from a center of the rim to the centerline of the respective first strip. The first sidewall further includes a plurality of third strips. A centerline of each third strip of the plurality of third strips is oriented at a second angle relative to a radial reference line extending from the center of the rim to the centerline of the respective third strip. The second angle is different than the first angle.

In one example, the composite material is a first composite material. The plurality of third strips are made of a second composite material. The second composite material is different than the first composite material. The plurality of first strips and the plurality of third strips are arranged about the center of the rim.

In one example, each first strip of the plurality of first strips overlaps portions of at least two respective third strips of the plurality of third strips, respectively, and each third strip of the plurality of third strips overlaps a portion of at least one first strip of the plurality of first strips, respectively.

In one example, a wheel for a bicycle includes a central hub configured for rotational attachment to the bicycle, and a plurality of spokes attached to the central hub and extending radially outward from the hub, and a rim. The rim includes a radially inner portion disposed along an inner circumference of the rim. The plurality of spokes are attached to the radially inner portion of the rim. The rim also includes a first sidewall and a second sidewall spaced apart from the first sidewall. The first sidewall and the second sidewall extend radially outward from the radially inner portion. The rim includes a radially outer tire engaging portion disposed along an outer circumference of the rim. The radially outer tire engaging portion extends from the first sidewall and the second sidewall, respectively. The first sidewall includes a layer of a composite material. The layer of the composite material includes fabric plies of the composite material that are shaped as strips. The composite material includes a matrix of a polymer-based material and fibers of a reinforcing material. The strips include a first strip and a second strip. The second strip is adjacent to the first strip within the layer of the composite material. The second strip is nonparallel to the first strip.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The use of sheets of carbon fiber to manufacture a composite rim of the prior art does not allow for the discreet positioning of the carbon fibers within the rim. The present disclosure provides examples of rims and wheels that solve or improve upon one or more of the above-noted and/or other disadvantages with prior known rims and wheels. The disclosed rims include sidewalls formed by strips of one or more composite materials. The layup for one of the sidewalls includes at least one layer of strips of the one or more composite materials arranged in a pattern around a central axis of the rim. Each of the strips includes a number of continuous and parallel fibers, fiber strands, and/or fiber structures extending along a length of the respective strip. Each of the strips is aligned at an angle relative to a tangent of the rim, and the continuous fibers of the respective strip may extend at least from an inner diameter of the rim to an outer diameter of the rim. The strips are arranged in a pattern so as to distribute loads or to direct any distributed loads from the outer diameter such as, for example, from road impacts towards load-bearing pathways in the rim.

An advantage of the disclosed rims is that the use of strips of one or more composite materials to form one or both sidewalls of the rim produces a rim with a higher strength to weight ratio compared to prior art rims, and may produce a layup optimized for specific applications. For example, positioning of composite strips within a layup for a sidewall of the rim may be based on whether the sidewall is included in a front wheel or a rear wheel, whether the rim is subjected to wheel braking or rim braking, and/or whether the wheel is constructed using tangential lacing or radial lacing. Other advantages of the disclosed rims are the ease of using multiple materials to form the rim. For example, different subsets of strips that form a sidewall of a rim may be made of different materials having different properties, respectively. Also, raw material scrap is reduced by using long, thin strips cut directly from a material roll, which eliminates border scrap that results from an intermediate cut table layup using sheets of carbon fiber of the prior art.

Although fiber-reinforced composites including carbon fibers are described above and below, other fiber-based materials may also be used. For example, polyamide polymer fibers, aluminum oxide based fibers, silicon carbide fibers, other fibers, or any combination thereof may be used.

Figure 1:
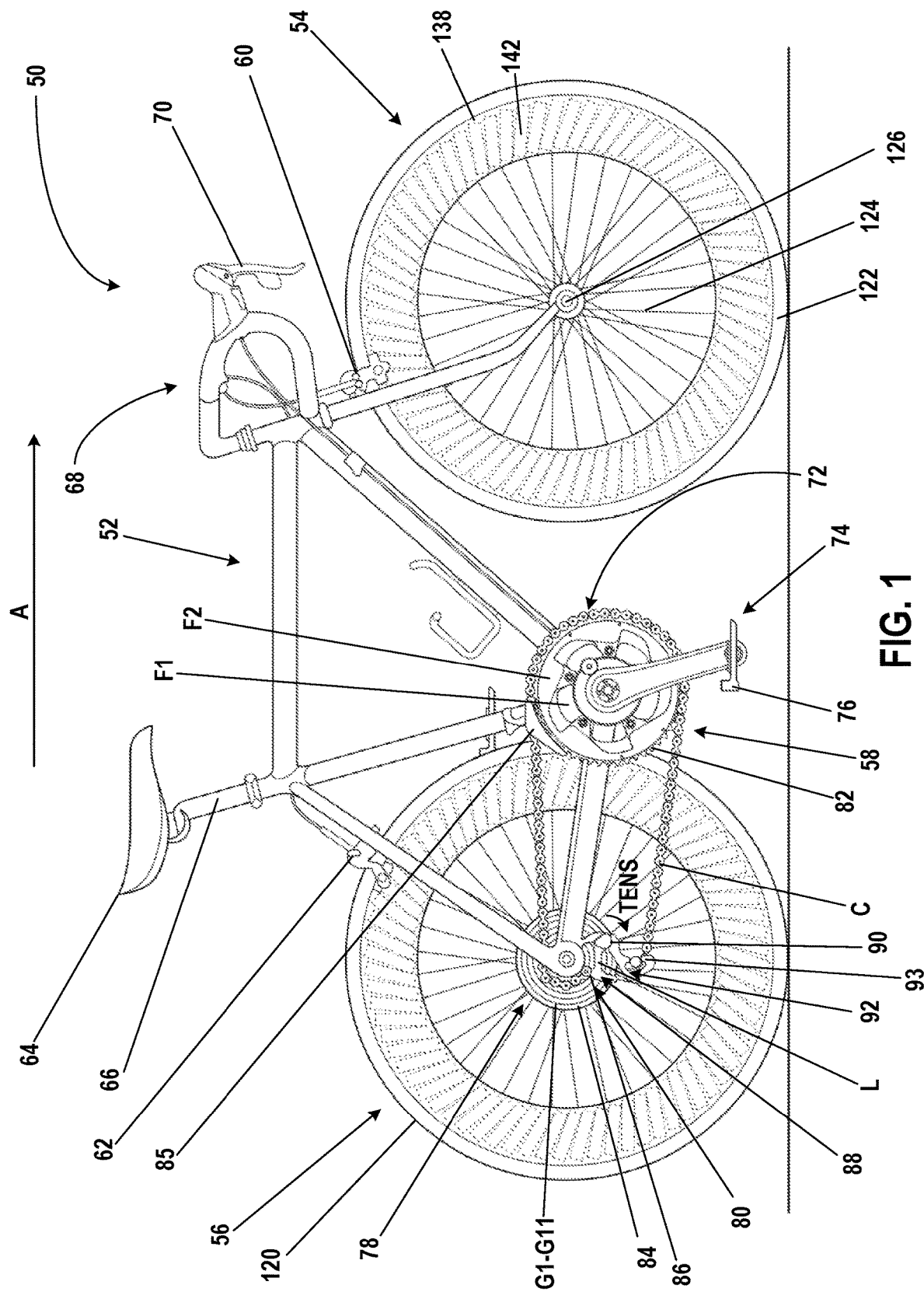
FIG. 1 is a side view schematic of a bicycle that may be constructed to utilize a composite rim.

Turning now to the drawings, FIG. 1 generally illustrates a bicycle 50 that employs rims constructed in accordance with the teachings of the present disclosure. The bicycle 50 includes a frame 52, a front wheel 54 and a rear wheel 56 each rotatably attached to the frame 52, and a drivetrain 58. A front brake 60 is provided for braking the front wheel 54, and a rear brake 62 is provided for braking the rear wheel 56. The bicycle 50 also generally has a seat 64 near a rear end of the frame 52 and carried on an end of a seat post 66 connected to the frame 52. The bicycle 50 also has handlebars 68 near a forward end of the frame 52. A brake lever 70 is carried on the handlebars 68 for actuating the front brake 60, the rear brake 62, or both the front brake 60 and the rear brake 62. If the brake lever 70 actuates only one of the front brake 60 and the rear brake 62, a second brake lever (not shown) may also be provided to actuate the other brake. A front and/or forward riding direction or orientation of the bicycle 50 is indicated by the direction of the arrow A in FIG. 1. As such, a forward direction for the bicycle 50 is indicated by the direction of arrow A. While the illustrated bicycle 50 depicted in FIG. 1 is a road bike having drop-style handlebars 68, the present disclosure may be applicable to bicycles of any type, including mountain bikes with full or partial suspensions.

The drivetrain 58 has a chain C and a front sprocket assembly 72, which is coaxially mounted with a crank assembly 74 having pedals 76. The drivetrain 58 also includes a rear sprocket assembly 78 coaxially mounted with the rear wheel 56 and a rear gear change mechanism, such as a rear derailleur 80.

As is illustrated in FIG. 1, the front sprocket assembly 72 may include one or more coaxially mounted chainrings, gears, or sprockets. In this example, the front sprocket assembly 72 has one or more sprockets F1, F2 each having teeth 82 around a respective circumference. As shown in FIG. 1, the rear sprocket assembly 78 may include a plurality (e.g., eleven) of coaxially mounted gears, cogs, or sprockets G1-G11. Each sprocket G1-G11 also has teeth 84 arranged around a respective circumference. The number of teeth 82 on the smaller diameter front sprocket F2 may be less than the number of teeth on the larger diameter sprocket F1. The numbers of teeth 84 on the rear sprockets G1-G11 may gradually decrease from the largest diameter rear sprocket G1 to the smallest diameter sprocket G11. Though not described in any detail herein, a front gear changer 85 may be operated to move from a first operating position to a second operating position to move the chain C between the front sprockets F1, F2. Likewise, the rear derailleur 80 may be operable to move between eleven different operating positions to switch the chain C to a selected one of the rear sprockets G1-G11. In an embodiment, the rear sprocket assembly 72 may have more or fewer sprockets. For example, in an embodiment, a rear sprocket assembly may have twelve or thirteen sprockets. Dimensions and configuration of the rear derailleur 80 may be modified to accommodate a specific implemented plurality of sprockets. For example, an angle and length of the linkage and/or the configuration of the cage of the derailleur may be modified to accommodate specific sprocket combinations.

The rear derailleur 80 is depicted as a wireless, electrically actuated rear derailleur mounted or mountable to the frame 52, or frame attachment, of the bicycle 50. The electric rear derailleur 80 has a base member 86 (e.g., a b-knuckle) that is mounted to the bicycle frame 52. A linkage 88 has two links L that are pivotally connected to the base member 86 at a base member linkage connection portion. A movable member 90 (e.g., a p-knuckle) is connected to the linkage 88 at a moveable member linkage connection portion. A chain guide assembly 92 (e.g., a cage) is configured to engage and maintain tension in the chain and has one or more cage plates 93 with a proximal end that is pivotally connected to a part of the movable member 90. The cage plate 93 may rotate or pivot about a cage rotation axis in a damping direction and a chain tensioning direction TENS. Other gear changing systems, such as mechanically or hydraulically controlled and/or actuated systems may also be used.

A motor module may be carried on the electric rear derailleur 80 with a battery. The battery supplies power to the motor module. In one example, the motor module is located in the movable member 90. However, the motor module may instead be located elsewhere, such as in one of the links L of the linkage 88 or in the base member 86. The motor module may include a gear mechanism or transmission. As is known in the art, the motor module and gear mechanism may be coupled with the linkage 88 to laterally move the cage plate 93 and thus switch the chain C among the rear sprockets (e.g. G1-G11) on the rear sprocket assembly 78.

The cage plate 93 also has a distal end that carries a tensioner cog or wheel. The wheel also has teeth around a circumference. The cage plate 93 is biased in the chain tensioning direction TENS to maintain tension in the chain C. The chain guide assembly 92 may also include a second cog or wheel, such as a guide wheel disposed nearer the proximal end of the cage plate 93 and the movable member 90. In operation, the chain C is routed around one of the rear sprockets (e.g. G1-G11). An upper segment of the chain C extends forward to the front sprocket assembly 72 and is routed around one of the front sprockets F1 or F2. A lower segment of the chain C returns from the front sprocket assembly 72 to the tensioner wheel and is then routed forward to the guide wheel. The guide wheel directs the chain C to the rear sprockets (e.g. G1-G11). Lateral movement of the cage plate 93, tensioner wheel, and guide wheel may determine the lateral position of the chain C for alignment with a selected one of the rear sprockets (e.g. G1-G11).

The bicycle 50 may include one or more bicycle control devices mounted to handlebars 68. The bicycle control devices may include one or more types of bicycle control and/or actuation systems. For example, the bicycle control devices may include brake actuation systems to control the front brake 60 and/or the rear brake 62, and/or gear shifting systems to control the drivetrain 58. Other control systems may also be included. For example, the system may be applied, in some embodiments, to a bicycle where only a front or only a rear gear changer is used. Also, the one or more bicycle control devices may also include suspension and/or other control systems for the bicycle 50.

Figure 2:
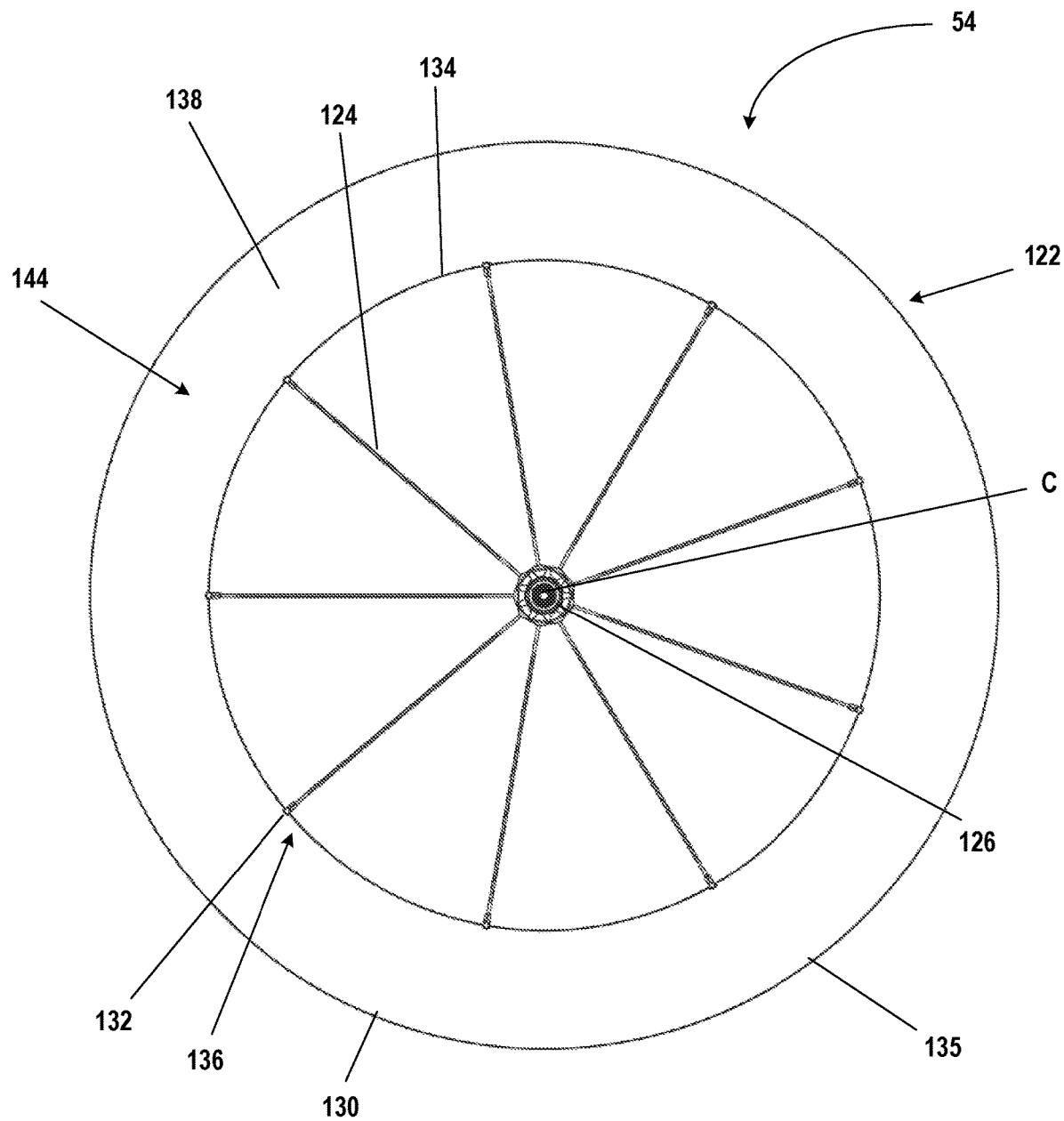
FIG. 2 is a side view of a wheel for a bicycle, such as the bicycle of FIG. 1.

The front wheel 54 and/or the rear wheel 56 of the bicycle 50 may include a tire 120 attached to a radially outer tire engaging portion of a rim 122. As shown in FIGS. 1 and 2, a plurality of spokes 124 are attached directly to the rim 122. Alternatively, the spokes 124 may be attached and/or secured to the rim 122 with other structural components. The spokes 124 extend from the rim 122 and attach to a central hub 126. The spokes 124 are maintained with a tension between the rim 122 and the central hub 126 to provide the respective wheel 54, 56 with an operational rigidity for use on the bicycle 50. The central hub 126 is configured for rotational attachment to the bicycle frame 52.

FIG. 2 illustrates a bicycle wheel having a rim 122, spokes 124, and a central hub 126, such as the front wheel 54 of FIG. 1, removed from the rest of the bicycle 50 and without a tire attached. The rim 122 includes a tire engaging portion 130 to engage with the tire 120, as is shown in FIG. 1. The tire engaging portion 130 is configured radially outward of a spoke receiving surface 132 that is disposed along an inner circumference 134 of the rim 122. In other words, the tire engaging portion 130 is a radially outer tire engaging portion. In an embodiment, the tire engaging portion 130 is disposed along an outer circumference 135 of the rim 122. The tire engaging portion 130 is configured for attachment to tires using clincher tire attachment configurations for tires including beaded interlock attachments. Other configurations of the tire engaging portion 130 may also be provided to allow for the use of other types of tires on the rim 122. For example, tubeless tires including beaded interlock attachment types may be used.

The rim 122 provides structure for attachment of the spokes 124 to the rim 122 at a receiving portion of the rim 122, proximate to the spoke receiving surface 132. As such, the spoke receiving surface 132 is part of a spoke engaging portion 136 (e.g., a radially inner portion) of the rim 122. In an embodiment, the spoke engaging portion 136 of the rim 122 is disposed along the inner circumference 134 of the rim 122. In another embodiment, the spoke receiving surface 132 and the spoke engaging portion 136 may be separate parts and/or portions of the rim 122. For example, the spokes 124 may pass through the spoke receiving surface 132, and the structure for attachment to the rim 122 may be provided proximate to the tire engaging portion 130.

The rim 122 includes a first sidewall 138 and a second sidewall that extend between the tire engaging portion 130 and the spoke engaging portion 136. For example, the first sidewall 138 and the second sidewall extend radially outward from the spoke engaging portion 136 to the tire engaging portion 130. The first sidewall 138 is spaced apart from the second sidewall.

At least part of the rim 122 (e.g., the first sidewall 138 and the second sidewall) is formed by one or more composite materials. In one embodiment, the entire rim 122 is formed by carbon-fiber reinforced plastic. The rim 122 may, however, be formed of other materials and/or material combinations. In one example, carbon-fiber reinforced plastic forms a one-piece unitary rim of a singular collection of carbon-fiber layers including the tire engaging portion 130, the first sidewall 138, the second sidewall, and the spoke engaging portion 136. Other configurations may also be provided.

The front wheel 54 and the rear wheel 56 may include rims 122 configured for any size wheel. In an embodiment, the rims 122 are configured for use in wheels conforming to a 700 C (e.g. a 622 millimeter diameter clincher and/or International Standards Organization 622 mm) bicycle wheel standard.

The front wheel 54 and the rear wheel 56 may rotate about the central hub 126 in either direction. For example, as shown in FIG. 2, the front wheel 54 and the rear wheel 56 may be configured to rotate in a particular rotational direction about the central hub 126. In another example, the front wheel 54 and the rear wheel 56 may be configured to rotate in a direction opposite the particular rotational direction.

Referring to FIG. 1, the first sidewall 138 and the second sidewall of the front wheel 54 and/or the rear wheel 56 of the bicycle 50 (e.g., the front wheel 54 and the rear wheel 56 in the example FIG. 1) are at least partially formed by one or more layers of the one or more composite materials. In one embodiment, the first sidewall 138 and the second sidewall of the front wheel 54 and the rear wheel 56 of the bicycle 50, respectively, are each formed by a single layer of a composite material.

Each layer of the composite material includes fabric plies of the composite material that are shaped as strips 142. The strips 142 of the first sidewall 138 and the second sidewall of the front wheel 54 are disposed about the central hub 126 of the front wheel 54, respectively, and the strips 142 of the first sidewall 138 and the second sidewall of the rear wheel 56 are disposed about the central hub 126 of the rear wheel 56, respectively. In a manufacturing process, the strips 142 of the front wheel 54 and the rear wheel 56, respectively, are integrated with the spoke engaging portion 136 and the tire engaging portion 130 of the respective wheel 54, 56 by, for example, a curing process, such that a one-piece unitary rim 122 is formed. The rims 122 of the front wheel 54 and rear wheel 56, respectively, may be formed with other manufacturing processes.

The first sidewall 138 and the second sidewall of each of the front wheel 54 and the rear wheel 56 may include covers 144, respectively (See FIG. 2). The covers 144 may be provided for aerodynamics and to protect the respective wheel 54, 56 from debris. The covers 144 may be made of the same composite material as the first sidewall 138 and the second sidewall of the respective wheel 54, 56, or may be made of a different material than the first sidewall 138 and the second sidewall of the respective wheel 54, 56. The covers 144 may be part of one-piece unitary rims 122 and may be integrated within the respective rim 122 during, for example, the curing process. In one embodiment, the covers 144 are separate parts from the one-piece unitary rims 122 and are connected to the rims 122 in any number of ways including, for example, with one or more connectors. In other embodiments, the front wheel 54 and/or the rear wheel 56 does not include covers 144.

Figure 3:
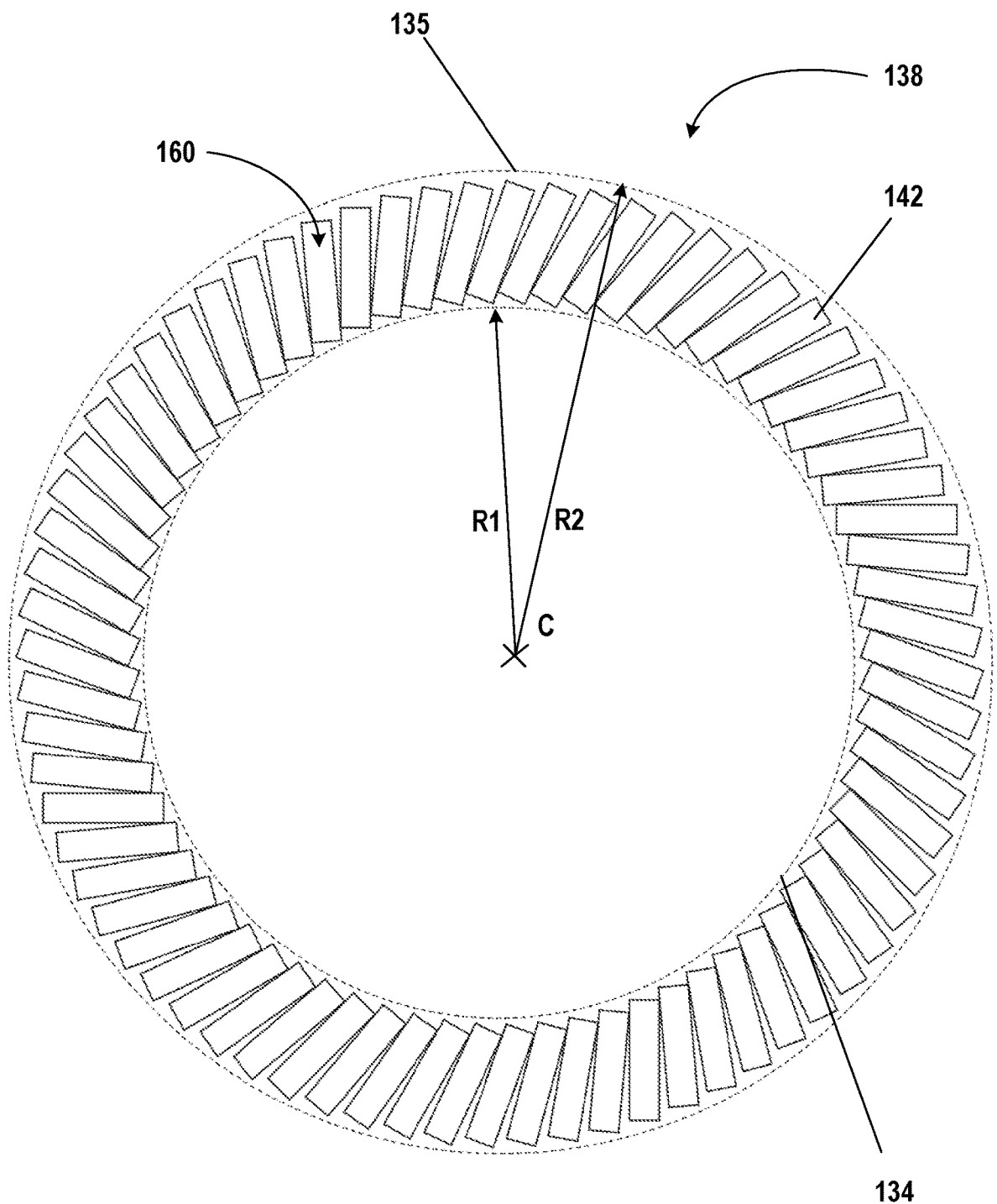
FIG. 3 is a side view of an uncured sidewall of a composite rim formed by strips.

FIG. 3 illustrates one embodiment of a layup pattern of strips 142 for the first sidewall 138 or the second sidewall prior to the curing process. The strips 142, after the curing process, may be part of a one-piece unitary rim 122. The layup pattern (e.g., for the first sidewall 138) includes a layer 160 of the composite material. The layer 160 of the composite material includes fabric plies (e.g., the strips 142). The layup pattern for the first sidewall 138, for example, prior to the curing process, is circular in shape. The strips 142 are arranged around a center C, between an inner circumference of the layup pattern defined by a first radius R1 and an outer circumference of the layup pattern defined by a second radius R2. The inner circumference and the outer circumference of the layup pattern may, for example, define the inner circumference 134 of the rim 122 and the outer circumference 135 of the rim 122, respectively. The first sidewall 138 may include any number of strips. For example, the first sidewall 138 may include 70 strips 142. More or fewer strips 142 may be included within the first sidewall 138 depending on a size and/or a shape of the strips 142, and/or a size of the rim 122.

Figure 4:
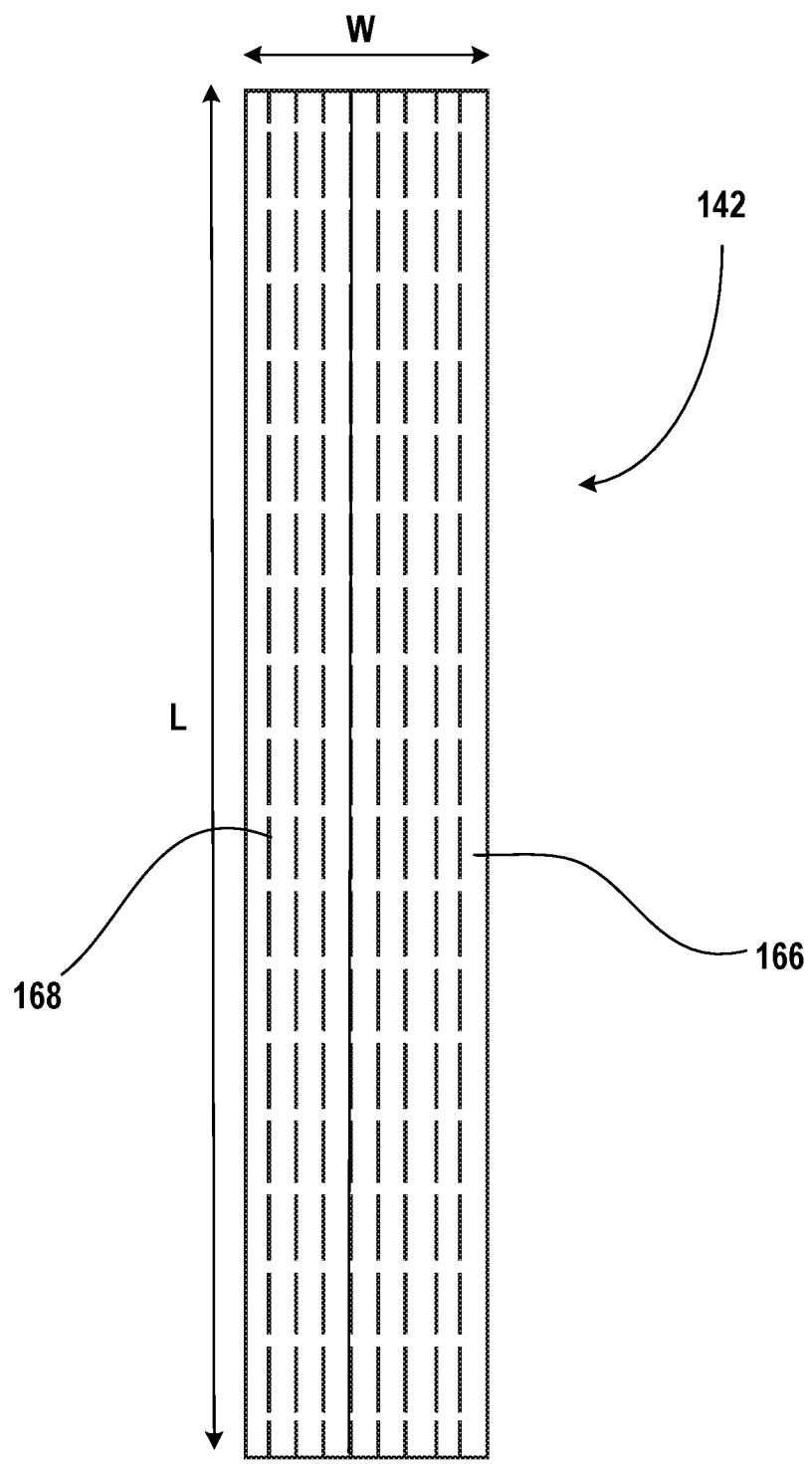
FIG. 4 is a side view of one of the strips of FIG. 3.

FIG. 4 illustrates one embodiment of a strip 142 of the composite material. The composite material includes a matrix 166 of a polymer-based material and fibers 168 of a reinforcing material. The polymer-based material may be any number of materials including, for example, a plastic, an acrylic, a resin, an epoxy, another polymer-based material, or any combination thereof. The fibers of the reinforcing material may be carbon fibers. Other polymer-based materials and/or other reinforcing fibers may be used.

The fibers 168 extend along a finite length L of the strip 142. In one embodiment, the fibers 168 extend in a primary strength direction of the strip 142 (e.g., along the length L of the strip 142). For example, the strip 142 has unidirectional fiber orientation along the length L. In another embodiment, some of the fibers 168 do not extend in the primary strength direction (e.g., less than 20 percent of the fibers, less than 10 percent of the fibers, or less than 5% percent of the fibers). The strip 142 may be any number of shapes and/or sizes. For example, the strip 142 is rectangular in shape. Other shapes such as, for example, square shaped strips and non-rectangular parallelogram shaped strips, may be provided. The strip 142 also includes a width W that is perpendicular to the length L. The length L may be defined by a size of, for example, the first sidewall 138 and/or the second sidewall of the rim 122. In one embodiment, the width W of the strip 142 is between 10 mm and 30 mm. For example, the width W of the strip 142 is 20 mm. In other embodiments, the strip 142 is wider or narrower. Smaller strip widths better optimize fiber orientation but come with a cost of added manufacturing complexity.

The strips 142, for example, provide ultimate strength in a direction of fiber grain. Accordingly, fiber alignment relative to an inner diameter of the rim 122 is provided for increasing strength of the rim 122. The width W of the strip 142 is an important variable in maximizing fiber alignment relative to a prescribed orientation. The further the fibers are from the center C of the rim 122, the more the angle of the fiber relative to the rim tangent changes, which reduces the ability of the fiber to support stresses and load. Using strips 142 with a narrow width limits an orientation error of the fibers. As long as the orientation error of all of the fibers included in a strip 142 is within a critical error value, the strength of the fibers is retained.

Figure 5:
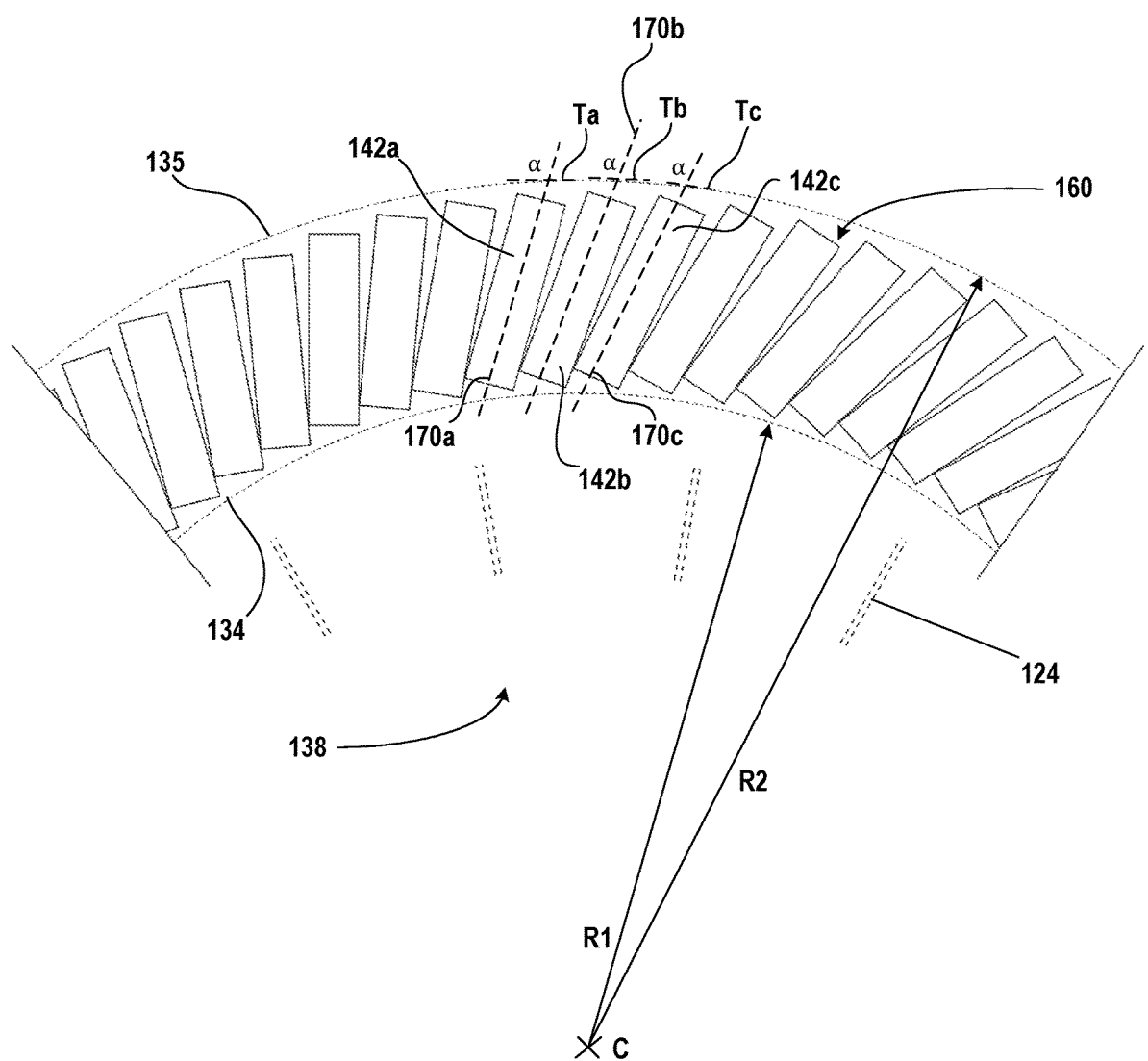
FIG. 5 is a close-up side view of the uncured sidewall of FIG. 3.

FIG. 5 shows a close-up side view of the layup pattern of FIG. 3 (e.g., for the first sidewall 138 or the second sidewall). The layer 160 of the composite material includes a first strip 142a and a second strip 142b adjacent to the first strip 142a. The second strip 142b is nonparallel to the first strip 142a. In other words, a centerline 170a of the first strip 142a (e.g., a first centerline 170a) is nonparallel to a centerline 170b of the second strip 142b (e.g., a second centerline 170b). In the embodiment shown in FIGS. 3 and 5, each of the strips 142, including the first strip 142a and the second strip 142b, is at a different angle relative to a tangent Ta of the outer circumference 135 of the rim 122 at the first centerline 170a (e.g., a first tangent Ta). In other words, a centerline 170 of each of the strips 142 is at a different angle relative to the tangent Ta of the outer circumference 135 of the rim 122 at the first centerline 170a, respectively.

While each strip 142 is nonparallel to adjacent strips 142 (e.g., the second centerline 170b is nonparallel to the first centerline 170a and a centerline 170c of a third strip 142c (third centerline 170c)), the strips 142 of the first sidewall 138, for example, are arranged around the first sidewall 138 in a uniform layup pattern. For example, as shown in FIG. 5, an orientation angle α is the same for each of the strips 142. The orientation angle α is, for a respective strip 142, the angle between the centerline 170 and the tangent T of the outer circumference 135 of the rim 122 at the centerline 170. The orientation angle α may be measured at any radial distance along the respective centerline 170. For example, as shown in FIG. 5, the orientation angle α of the first strip 142a, as measured between the first centerline 170a and the first tangent Ta, and the orientation angle α of the third strip 142c, as measured between the third centerline 170c and a tangent Tc of the outer circumference 135 of the rim 122 at the third centerline 170c (e.g., a third tangent Tc), are the same. In the embodiment shown in FIG. 5, the orientation angle α for all of the strips 142 of the layer 160 of the composite material is 70°. In other embodiments, the orientation angle α for all of the strips 142 of the layer 160 of the composite material may be greater than or less than 70°, or different subsets of strips 142 within the layer 160 of the composite material may have different orientations angles α, respectively.

Figure 6:
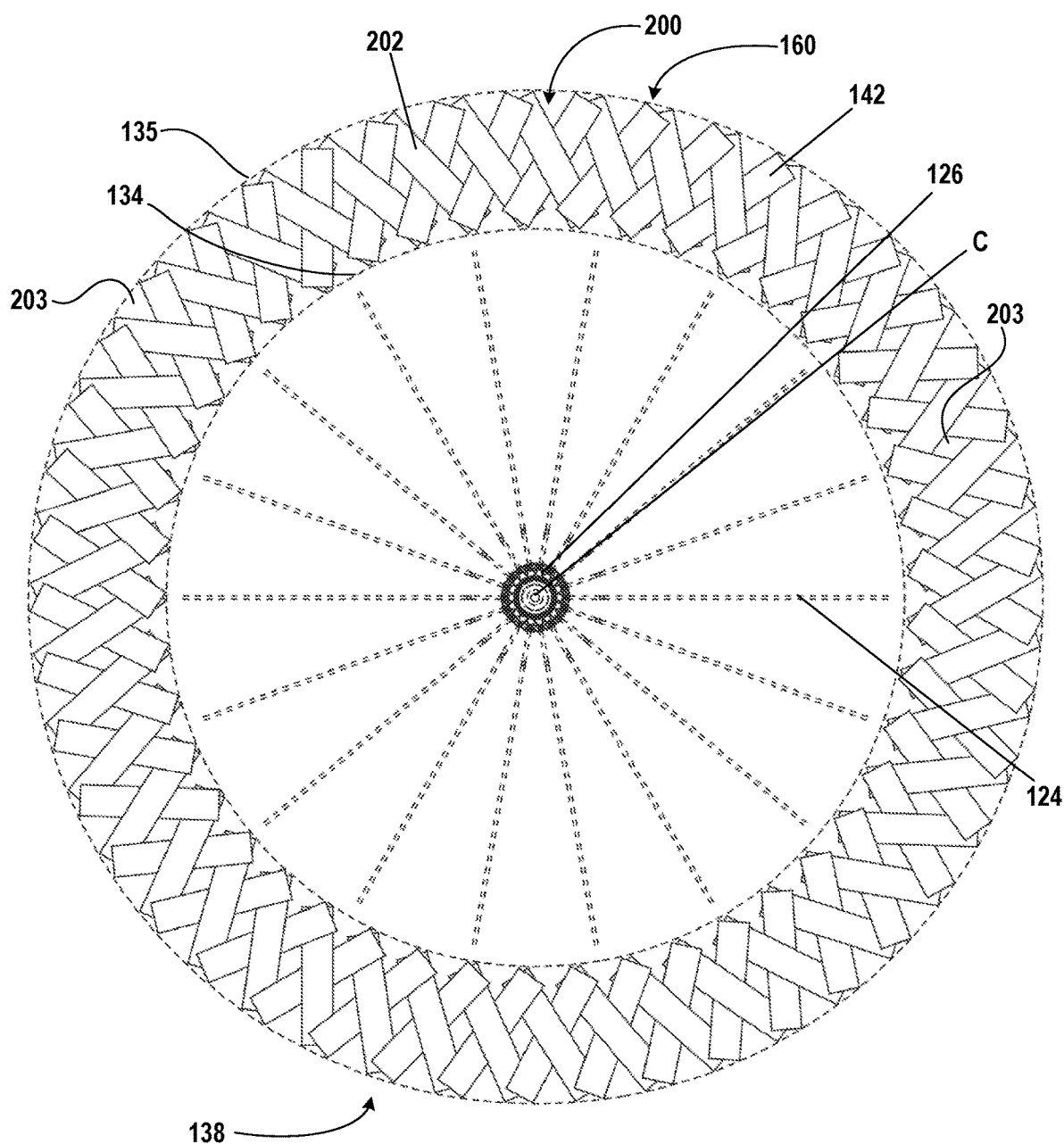
FIG. 6 is a side view of an uncured sidewall of a composite rim formed by strips positioned in a first woven pattern.
Figure 7:
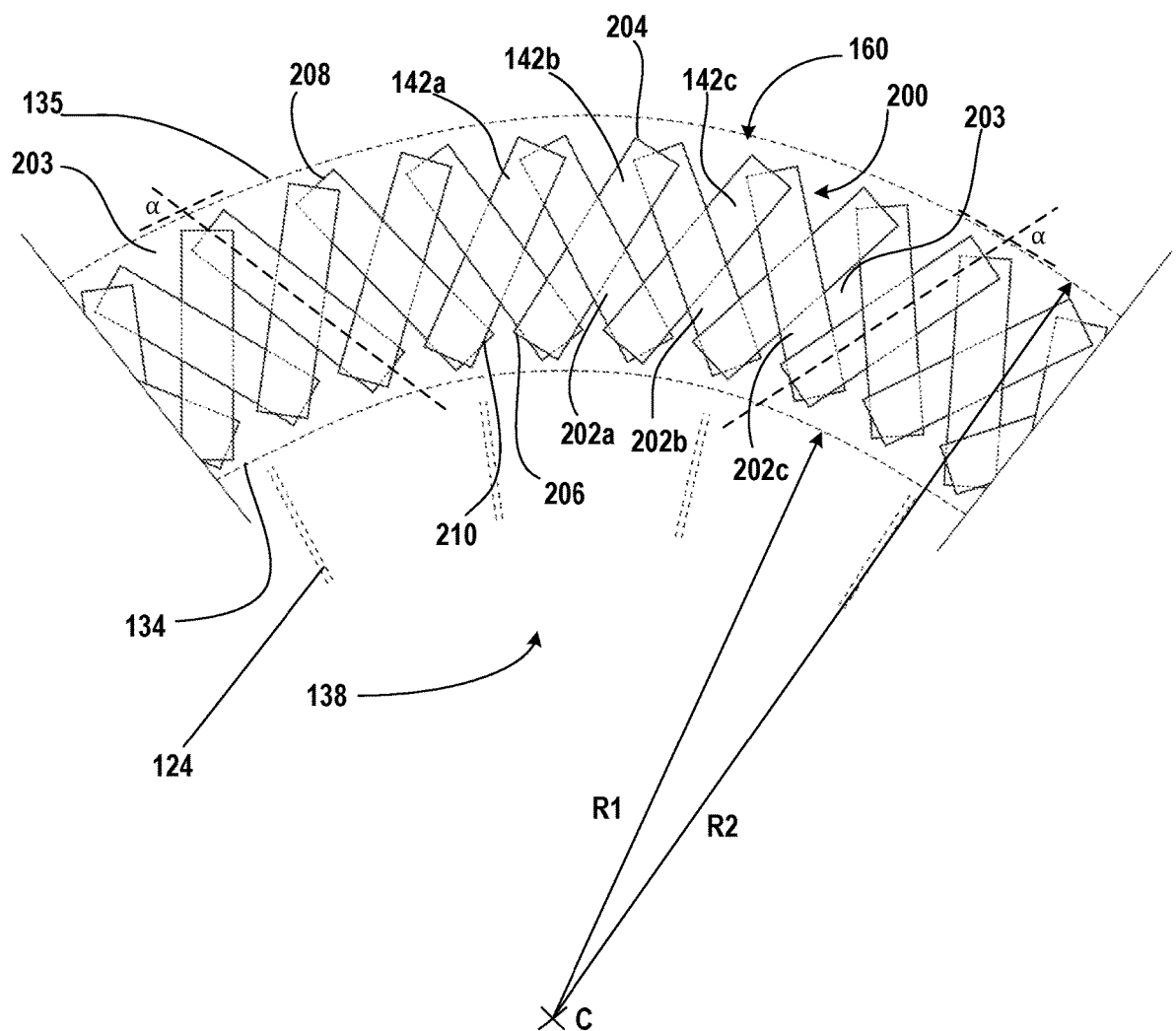
FIG. 7 is a close-up side view of the uncured sidewall of FIG. 6.

Referring to FIGS. 6 and 7, in one embodiment, the layup pattern may include another layer 200 of the composite material (e.g., for the first sidewall 138 or the second sidewall). For example, the layer 160 of the composite material is a first layer of the composite material, and the other layer 200 of the composite material is a second layer of the composite material. In one embodiment, at least part of the second layer 200 is made of a different composite material than the first layer 160 of the composite material.

The second layer 200 of the composite material includes fabric plies (e.g., strips 202). The strips 202, like the strips 142 of the first layer 160 of the composite material, are arranged around the center C of the first sidewall 138 in a layup pattern. Adjacent strips 202 are nonparallel to each other. Like the strips 142, each of the strips 202 of the second layer 200 of the composite material includes a matrix of a polymer-based material and fibers (e.g., unidirectional along the length of the respective strip 202) of a reinforcing material. The polymer-based material may be any number of materials including, for example, a plastic, an acrylic, a resin, an epoxy, another polymer-based material, or any combination thereof. The fibers of the reinforcing material may be carbon fibers. Other polymer-based materials and/or other reinforcing fibers may be used.

The fibers of the strips 202 extend along a finite length of the respective strip 202 (see FIG. 4). In one embodiment, the fibers of the strips 202 extend in a primary strength direction of the respective strip 202 (e.g., along the length of the strip 202). For example, each of the strips 202 has unidirectional fiber orientation along the length of the respective strip 202. The strips 202 may be any number of shapes and/or sizes. For example, each of the strips 202 is rectangular in shape. Other shapes (e.g., square shaped) may be provided. Each of the strips 202 also includes a width that is perpendicular to the length. The length may be defined by a size of, for example, the first sidewall 138 and/or the second sidewall of the rim 122. In one embodiment, the width of each of the strips 202 is between 10 mm and 30 mm. For example, the width of each of the strips 202 is 20 mm. In other embodiments, the strips 202 are wider or narrower.

In the embodiment shown in FIGS. 6 and 7, the orientation angle α for each of the strips 142 of the first layer 160 is 60°, and the orientation angle α for each of the strips 202 of the second layer 200 is −60° (see FIG. 7). Other orientation angles α may be used for the strips 142 of the first layer 160 and/or the strips 202 of the second layer 200. In other embodiments, different subsets of the strips 142 of the first layer 160 and/or different subsets of the strips 202 of the second layer 200 may have different orientations angles α, respectively.

The layup pattern for the strips 142 of the first layer 160 and the strips 202 of the second layer 200 may be a woven layup pattern. For example, referring to FIG. 7, the first layer 160 of the composite material includes the first strip 142a, the second strip 142b, and the third strip 142c, and the second layer 200 of the composite material includes a fourth strip 202a, a fifth strip 202b, and a sixth strip 202c. Each of the strips 142 of the first layer 160, including the first strip 142a, the second strip 142b, and the third strip 142c, includes a first end 204 and a second end 206 opposite the first end 204. Each of the strips 202 of the second layer 200, including the fourth strip 202*a*, the fifth strip 202*b*, and the sixth strip 202*c*, includes a first end 208 and a second end 210.

As an example of the woven layup pattern, the first end 204 of the first strip 142*a* overlaps at least a portion of the first end 208 of the fourth strip 202*a*, and the fourth strip 202*a* overlaps a portion (e.g., a middle portion) of the second strip 142*b*. The first end 204 of the second strip 142*b* overlaps at least a portion of the first end 208 of the fifth strip 202*b*, and the fifth strip 202*b* overlaps a portion (e.g., a middle portion) of the third strip 142*c*. The first end 204 of the third strip 142*c* overlaps at least a portion of the first end 208 of the sixth strip 202*c*, and the second end 206 of the third strip 142*c* overlaps at least a portion of the second end 210 of the fourth strip 202*a*. This pattern is repeated around, for example, the first sidewall 138 of the rim 122.

Due to the woven layup pattern, open spaces 203 are formed between the strips 142 of the first layer 160 and the strips 202 of the second layer 200. The open spaces 203 may remain after the curing process. Alternatively, the rim 122 may include a cover (see FIG. 2 that covers the strips 142 of the first layer 160 and the strips 202 of the second layer 200). Alternatively, the open spaces 203 may be filled with one or more materials (e.g., one or more composite materials; a carbon fiber reinforced material).

Figure 8:
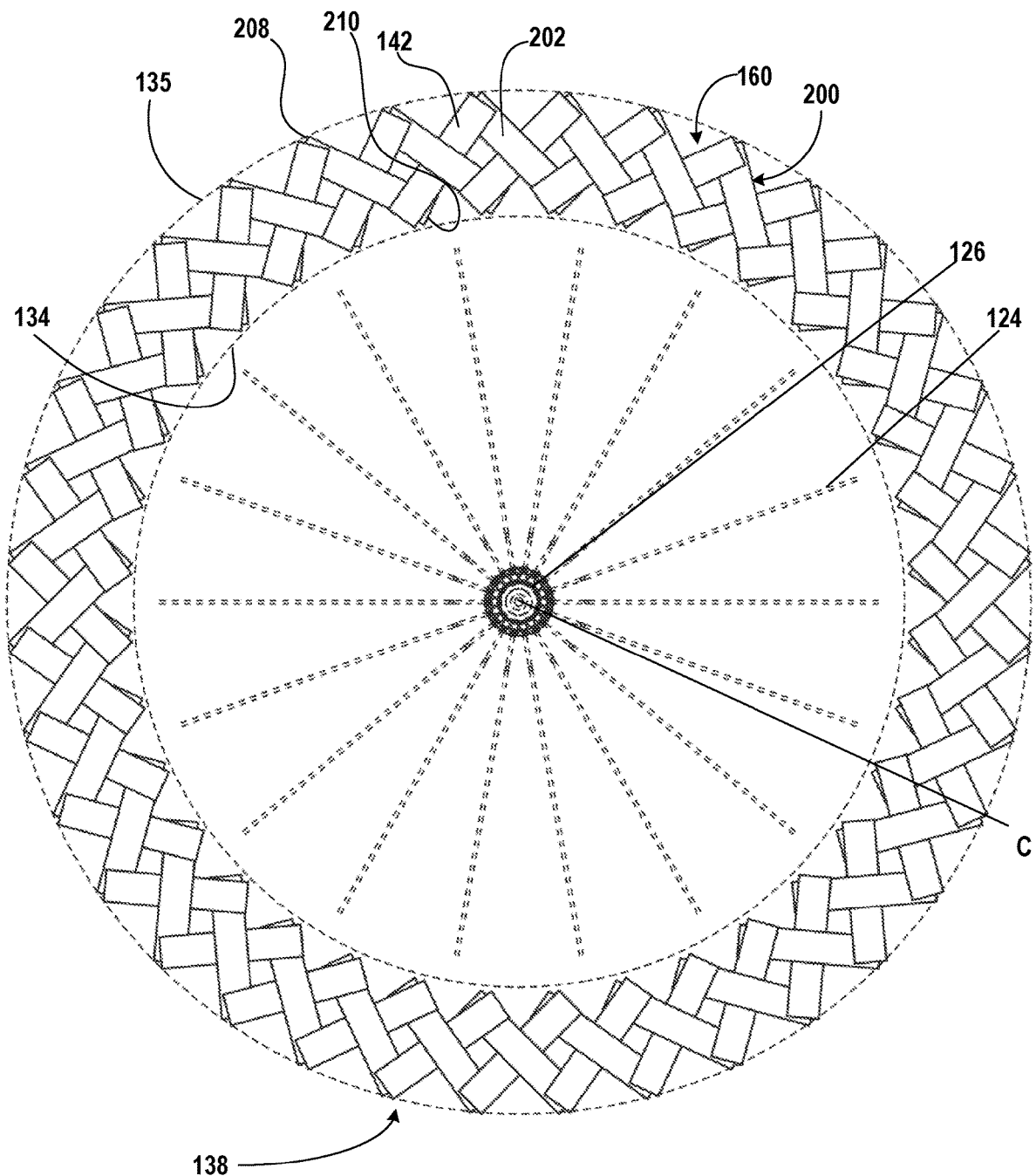
FIG. 8 is a side view of an uncured sidewall of a composite rim formed by strips positioned in a second woven pattern.
Figure 9:
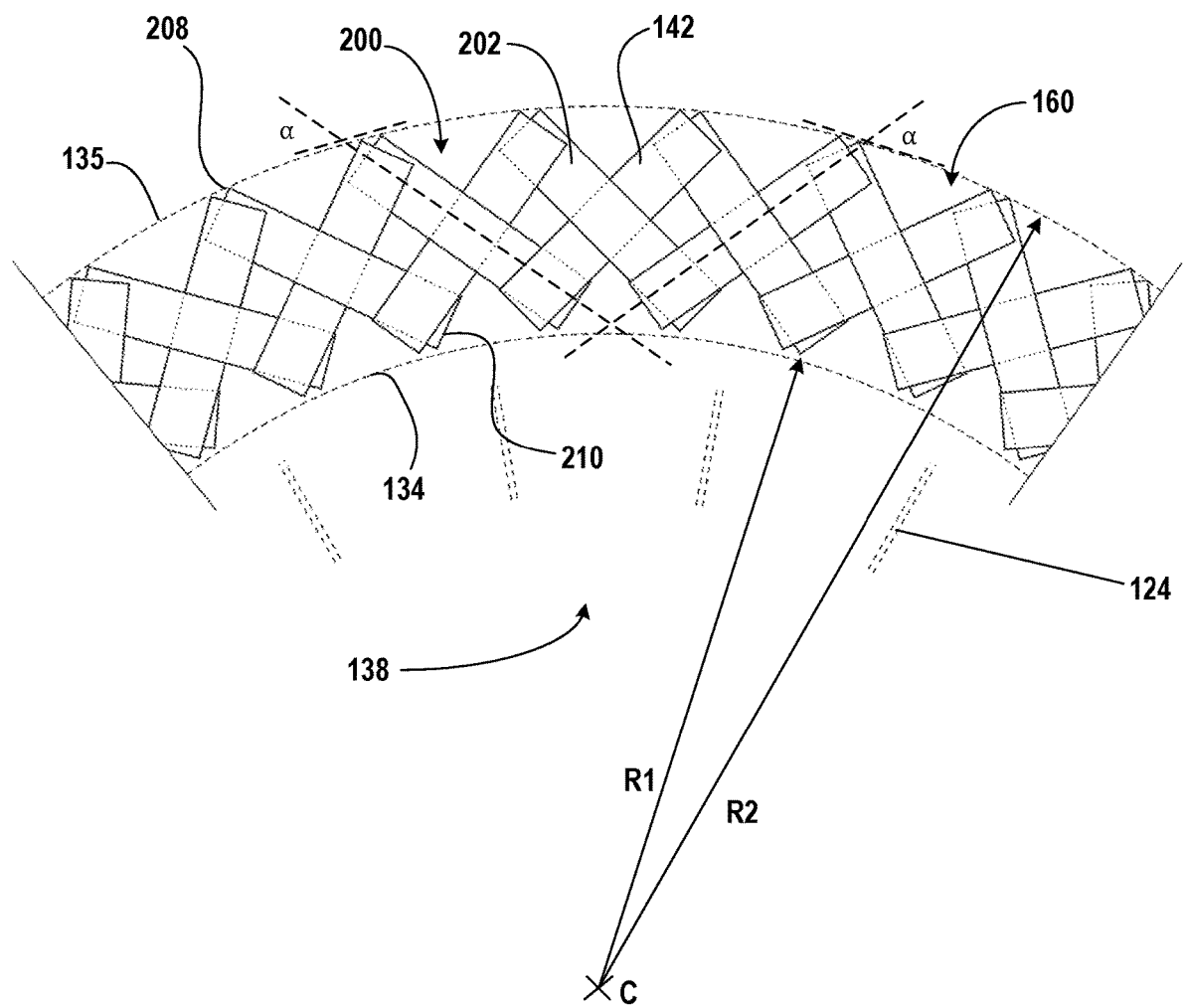
FIG. 9 is a close-up side view of the uncured sidewall of FIG. 8.

Other woven layup patterns may be provided. For example, referring to FIGS. 8 and 9, the orientation angle α for each of the strips 142 of the first layer 160 is 45°, and the orientation angle α for each of the strips 202 of the second layer 200 is −45°. The 45° and −45° orientation angles α for the strips 142 of the first layer 160 and the strips 202 of the second layer 200, respectively, provide for different overlap (e.g., more overlap) compared to the embodiment shown in FIGS. 6 and 7. For example, the strips 142 of the first layer 160 overlap larger portions of the strips 202 of the second layer at or adjacent to the first ends 208 and the second ends 210 of the strips 202, respectively, compared to the embodiment shown in FIGS. 6 and 7. Different orientation angles α and/or different overlapping may be provided.

The first layer 160 of the composite material, the second layer 200 of the composite material, and/or one or more other layers of the composite material or another composite material may be fully contained within the first sidewall 138 or the second sidewall. For example, as illustrated with the embodiment shown in FIGS. 3 and 5, the strips 142 of the first layer 160 may be fully contained within the first sidewall 138 or the second sidewall of the rim 122. As another example, as illustrated with the embodiments shown in FIGS. 6 and 7, and FIGS. 8 and 9, respectively, the strips 142 of the first layer 160 and the strips 202 of the second layer 200 may be fully contained within the first sidewall 138 or the second sidewall. In other words, the strips 142 of the first layer 160 and the strips 202 of the second layer 200 may not extend beyond the inner circumference 134 of the rim 122 and/or the outer circumference 135 of the rim 122. In other embodiments, the first sidewall 138 and/or the second sidewall includes one or more additional layers of the composite material or another composite material, and the one or more additional layers of the composite material or the other composite material are also fully contained within the first sidewall 138 and/or the second sidewall.

Figure 10:
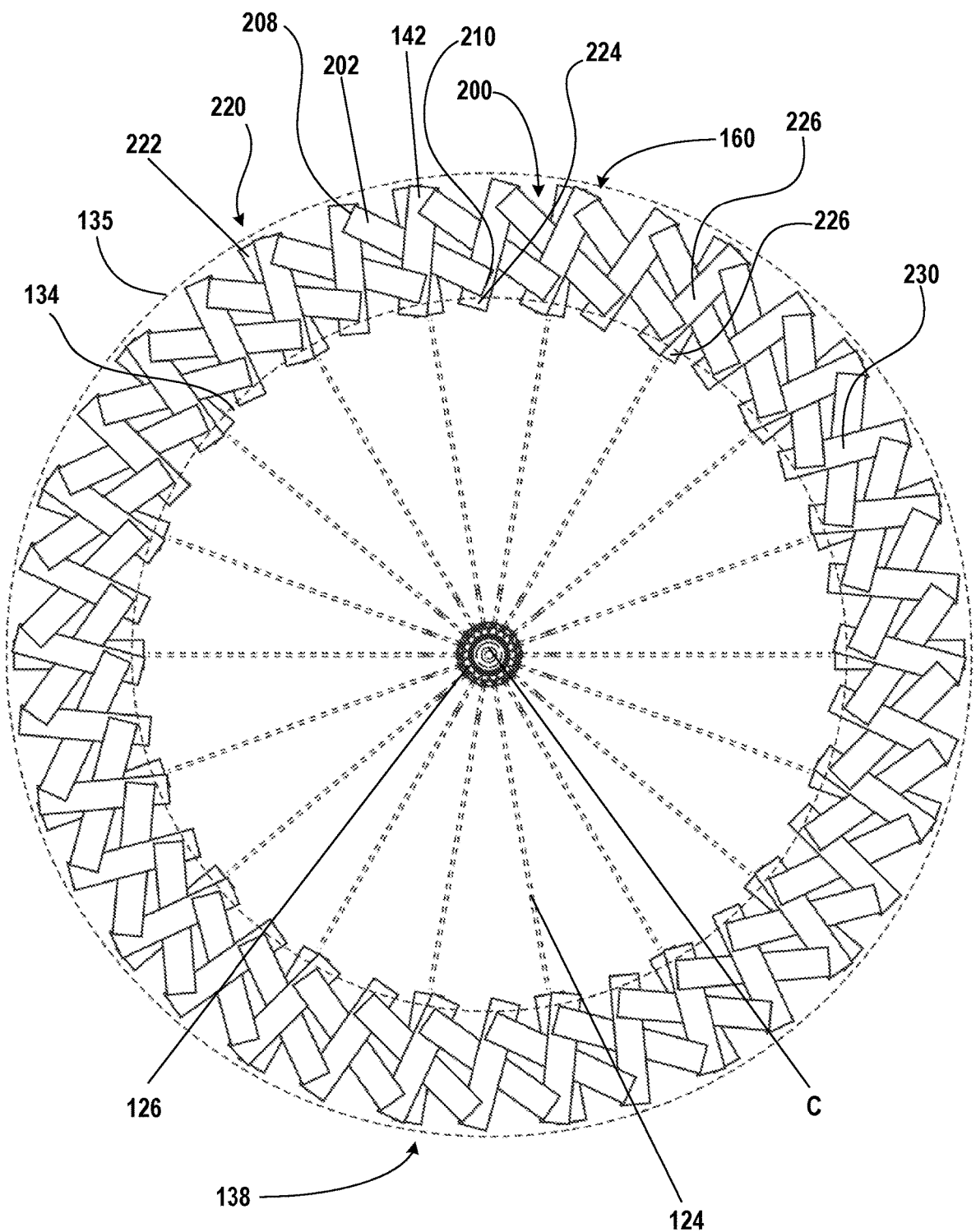
FIG. 10 is a side view of an uncured sidewall of a composite rim formed by strips positioned in a third woven pattern.
Figure 11:
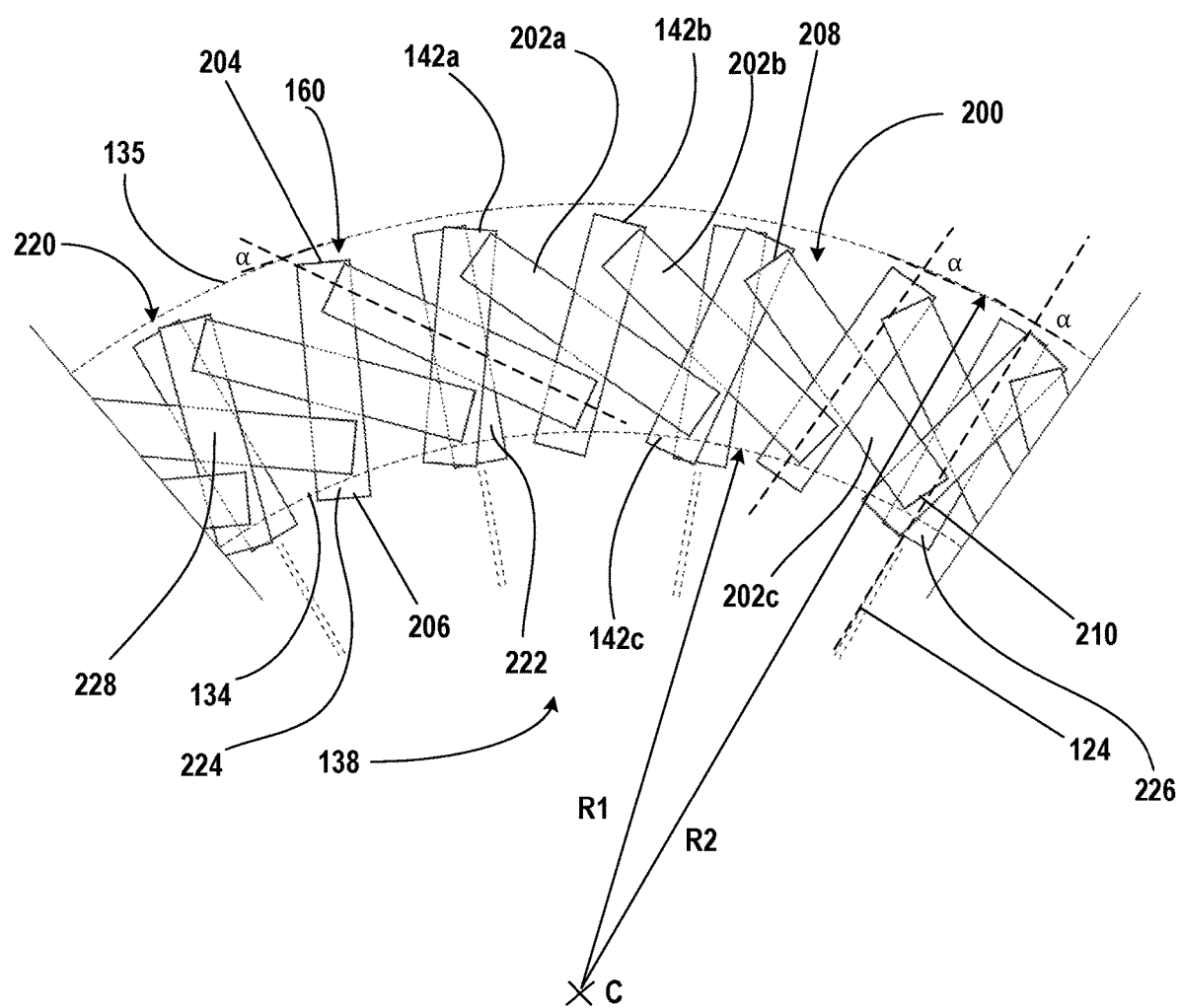
FIG. 11 is a close-up side view of the uncured sidewall of FIG. 10.

In other embodiments, one or more strips of one or more layers of composite material may extend beyond the first sidewall 138 and/or the second sidewall of the rim 122. Referring to FIGS. 10 and 11, the first sidewall 138 and/or the second sidewall include the first layer 160 of the composite material, the second layer 200 of the composite material, and a third layer 220 of the composite material. In one embodiment, the third layer 220 includes a different composite material than the first layer 160 and/or the second layer 200.

The third layer 220 of the composite material, for example, includes fabric plies (e.g., strips 222). The strips 222, like the strips 142 of the first layer 160 and the strips 202 of the second layer 200, are arranged around the center C of the first sidewall 138, for example, in a layup pattern. Like the strips 142 and the strips 202, each of the strips 222 of the third layer 220 includes a matrix of a polymer-based material and fibers (e.g., unidirectional along the length of the respective strip 222) of a reinforcing material. The polymer-based material may be any number of materials including, for example, a plastic, an acrylic, a resin, an epoxy, another polymer-based material, or any combination thereof. The fibers of the reinforcing material may be carbon fibers. Other polymer-based materials and/or other reinforcing fibers may be used.

The fibers of the strips 222 extend along a finite length of the respective strip 222 (see FIG. 4). In one embodiment, the fibers of the strips 222 extend in a primary strength direction of the respective strip 222 (e.g., along the length of the strip 222). For example, each of the strips 222 has unidirectional fiber orientation along the length of the respective strip 222. The strips 222 may be any number of shapes and/or sizes. For example, each of the strips 222 is rectangular in shape. Other shapes (e.g., square shaped) may be provided. Each of the strips 222 also includes a width that is perpendicular to the length. The length may be defined by a size of, for example, the first sidewall 138 and/or the second sidewall of the rim 122. In one embodiment, the width of each of the strips 222 is between 10 mm and 30 mm. For example, the width of each of the strips 222 is 20 mm. In other embodiments, the strips 222 are wider or narrower.

In the embodiment shown in FIGS. 10 and 11, the strips 142 of the first layer 160 and the strips 222 of the third layer 220 extend beyond the inner circumference 134 of the rim 122. For example, the strips 142 of the first layer 160 include overhang sections 224, respectively, that extend beyond the inner circumference 134 of the rim 122, and the strips 222 of the third layer 220 including overhang sections 226, respectively, that extend beyond the inner circumference 134 of the rim 122. In one embodiment, at least some of the strips 142 and/or the strips 222 also extend beyond the outer circumference 135 of the rim 122. In other embodiments, at least some of the strips 202 extend beyond the inner circumference 134 and/or the outer circumference 135 of the rim 122. In one embodiment, at least some of the strips 142 of the first layer 160, the strips 202 of the second layer 200, and/or the strips 222 of the third layer 220 extend partially around and partially form the spoke engaging portion 136, or extend around the spoke engaging portion 136 and at least partially form the spoke engaging portion 136 and the second sidewall of the rim 122. For example, the strips 142 extend around the spoke engaging portion 136 and form the second sidewall of the rim 122.

Compared to the number of the strips 142 of the first layer 160 and the number of the strips 202 of the second layer 200, the third layer 220 of the composite material includes fewer strips 222. For example, the first layer 160 includes 36 strips 142, the second layer 200 includes 36 strips 202, and the third layer 220 includes 18 strips 222. The first sidewall 138 and/or the second sidewall may include more or fewer strips 142 of the first layer 160, strips 202 of the second layer 200, and/or strips 222 of the third layer.

Spacing between the strips 222 is greater compared to the spacing between the strips 142 and the strips 202, respectively. This may, for example, be due to the strips 222 being positioned in line with the spokes 124 of the rim 122, respectively. The primary strength direction for each of the strips 222 (e.g., along the length of the respective strip 222) may be aligned with the respective spoke 124. Other positioning may be provided.

In line with each of the spokes 124, one of the strips 142 overlaps one of the strips 202, which overlaps one of the strips 222. In other words, in line with each of the spokes 124, one of the strips 142 overlaps one of the strips 202 and one of the strips 222 at an overlap position 228. The overlap position 228 is radially outward of the spoke engaging portion 136 of the rim 122 and radially inward of the outer circumference 135 of the rim 122. Other overlap positions 230, at which more or fewer than three strips (e.g., two strips; one of the strips 142 overlaps one of the strips 202) overlap, are also radially outward of the spoke engaging portion 136 of the rim 122 and radially inward of the spoke engaging portion 136 of the rim 122.

In the embodiment shown in FIGS. 10 and 11, the orientation angle α for each of the strips 142 of the first layer 160 is 75°, the orientation angle α for each of the strips 202 of the second layer 200 is −30°, and the orientation angle α for each of the strips 222 of the third layer 220 is 90°. The layup pattern of the strips 142, the strips 202, and the strips 222 is thus an asymmetric pattern. Other orientation angles α may be used for the strips 142 of the first layer 160, the strips 202 of the second layer 200, and/or the strips 222 of the third layer 220. In other embodiments, different subsets of the strips 142 of the first layer 160, different subsets of the strips 202 of the second layer 200, and/or different subsets of the strips 222 of the third layer 220 may have different orientations angles α, respectively.

The layup pattern for the strips 142 and the strips 202 may be a woven layup pattern on top of the third layer 220 of the composite material. For example, referring to FIG. 11, the first layer 160 includes the first strip 142a, the second strip 142b, and the third strip 142c, and the second layer 200 includes the fourth strip 202a, the fifth strip 202b, and the sixth strip 202c. Each of the strips 142 of the first layer 160, including the first strip 142a, the second strip 142b, and the third strip 142c, includes the first end 204 and the second end 206 opposite the first end 204. Each of the strips 202 of the second layer 200, including the fourth strip 202a, the fifth strip 202b, and the sixth strip 202c, includes the first end 208 and the second end 210.

As an example of the woven layup pattern, the first end 208 of the fourth strip 202a overlaps at least a portion of the first strip 142a at or adjacent to the first end 204 of the first strip 142a, and the second end 210 of the fourth strip 202a overlaps at least a portion of the third strip 142c (e.g., at or adjacent to the inner circumference 134 of the rim 122 and/or at or adjacent to the second end 206 of the third strip 142c). The second strip 142b overlaps a portion (e.g., a middle portion) of the fourth strip 202a. The fifth strip 202b overlaps at least a portion of the second strip 142b at or adjacent to the first end 204 of the second strip 142b, and the third strip 142c overlaps a portion (e.g., a middle portion) of the fifth strip 202b. The first end 208 of the sixth strip 202c overlaps at least a portion of the third strip 142c at or adjacent to the first end 204 of the third strip 142c. This pattern is repeated around, for example, the first sidewall 138 of the rim 122. The woven layup pattern of the strips 142 of the first layer 160 and the strips 202 of the second layer 200 is positioned on, for example, the third layer 220 of the composite material (e.g., with the strips 222 of the third layer 220 positioned in line with the spokes 124 of the rim).

Figure 12:
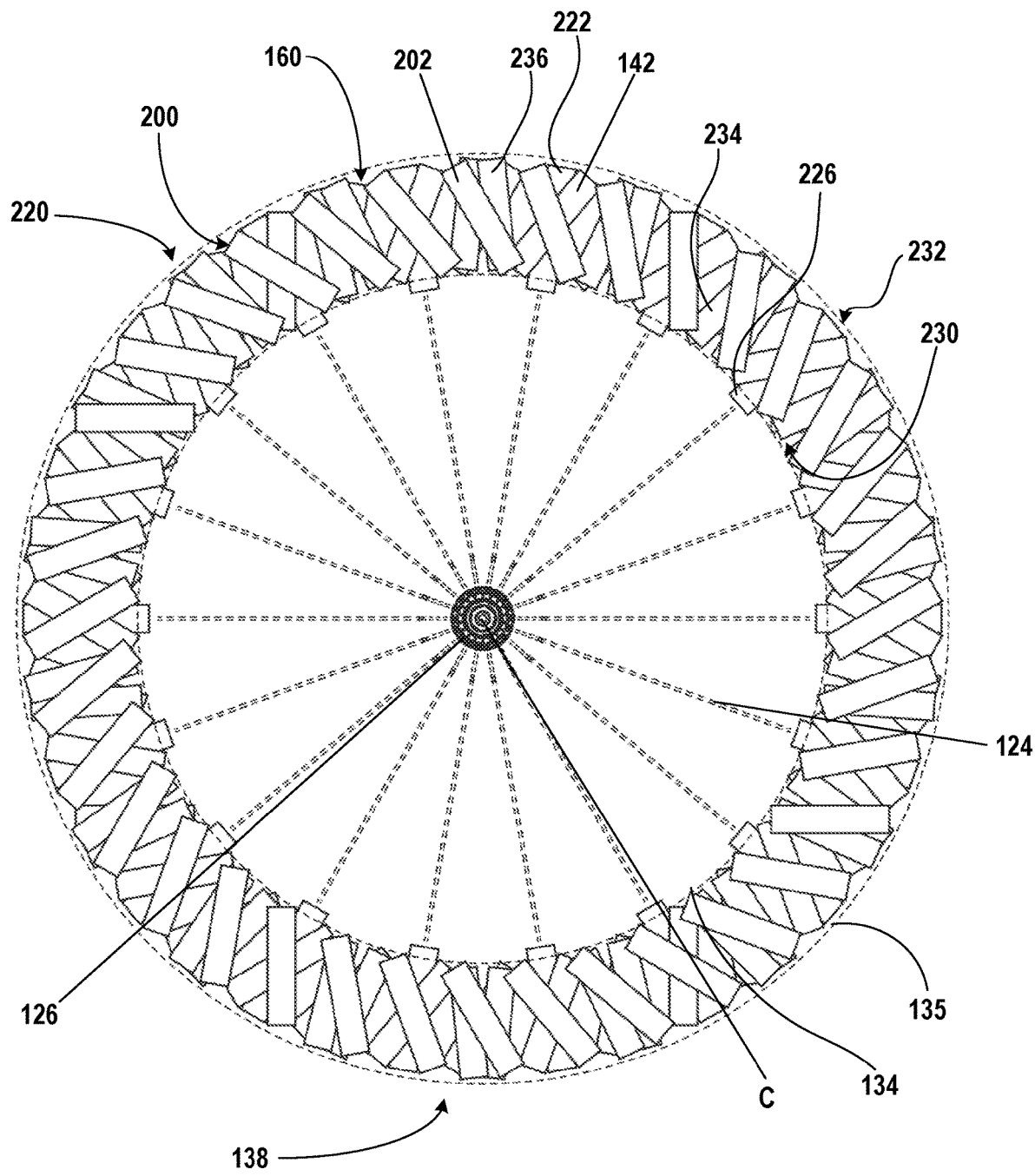
FIG. 12 is a side view of an uncured sidewall of a composite rim formed by strips positioned in a fourth woven pattern.
Figure 13:
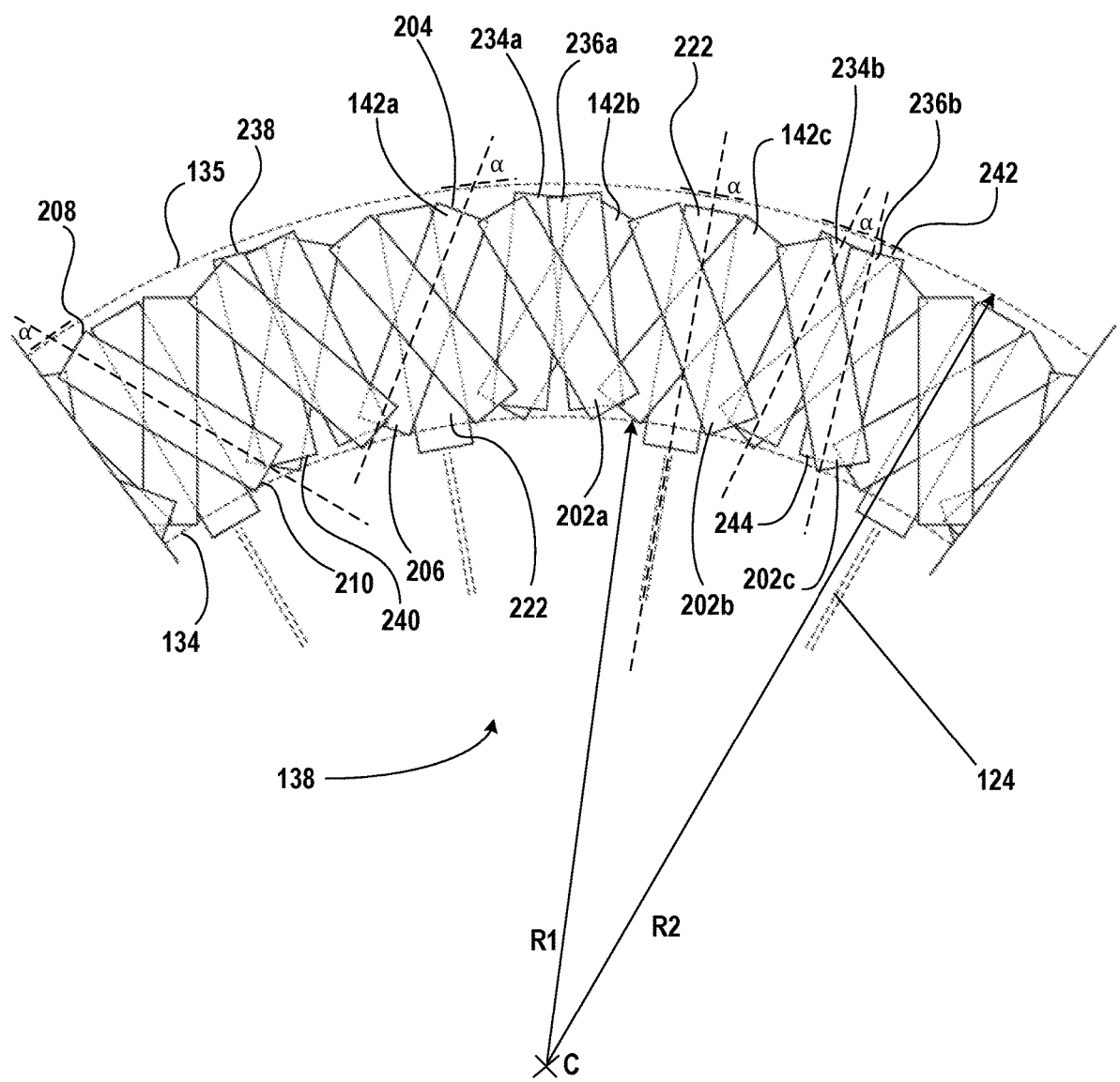
FIG. 13 is a close-up side view of the uncured sidewall of FIG. 12.

The first sidewall 138 and/or the second sidewall of the rim 122 may include additional layers of the composite material or another composite material. Referring to FIGS. 12 and 13, in one embodiment, the layup pattern (e.g., for the first sidewall 138 and/or the second sidewall) includes the first layer 160 of the composite material, the second layer 200 of the composite material, the third layer 220 of the composite material, a fourth layer 230 of the composite material, and a fifth layer 232 of the composite material. In one embodiment, the fourth layer 230 and/or the fifth layer 232 includes a different composite material than the first layer 160, the second layer 200, and/or the third layer 220.

The fourth layer 230 of the composite material, for example, includes fabric plies (e.g., strips 234), and the fifth layer 232 of the composite material, for example, includes fabric plies (e.g., strips 236). The strips 234 of the fourth layer 230 and the strips 236 of the fifth layer 232, along with the strips 142 of the first layer 160, the strips 202 of the second layer 200, and the strips 222 of the third layer 220, are arranged around the center C of the first sidewall 138, for example, in a layup pattern. Each of the strips 234 and the strips 236, for example, includes a matrix of a polymer-based material and fibers (e.g., unidirectional along the length of the respective strip 234, 236) of a reinforcing material. The polymer-based material may be any number of materials including, for example, a plastic, an acrylic, a resin, an epoxy, another polymer-based material, or any combination thereof. The fibers of the reinforcing material may be carbon fibers. Other polymer-based materials and/or other reinforcing fibers may be used.

The fibers of the strips 234 and the strips 236 extend along a finite length of the respective strip 234, 236 (see FIG. 4). In one embodiment, the fibers of the strips 234 and the strips 236 extend in a primary strength direction of the respective strip 234, 236 (e.g., along the length of the respective strip 234, 236). For example, each of the strips 234 and the strips 236 has unidirectional fiber orientation along the length of the respective strip 234, 236. The strips 234 and the strips 236 may be any number of shapes and/or sizes. For example, each of the strips 234 and the strips 236 is rectangular in shape. Other shapes (e.g., square shaped) may be provided. Each of the strips 234 and the strips 236 also includes a width that is perpendicular to the length. The length may be defined by a size of, for example, the first sidewall 138 and/or the second sidewall of the rim 122. In one embodiment, the width of each of the strips 234 and the strips 236 is between 10 mm and 30 mm. For example, the width of each of the strips 234 and the strips 236 is 20 mm. In other embodiments, the strips 234 and the strips 236 are wider or narrower.

In the embodiment shown in FIGS. 10 and 11, the strips 142 of the first layer 160, the strips 202 of the second layer 200, and the strips 222 of the third layer 220 extend beyond the inner circumference 134 of the rim 122. In one embodiment, at least some of the strips 142 of the first layer 160, the strips 202 of the second layer 200, and/or the strips 222 of the third layer 220 also extend beyond the outer circumference 135 of the rim 122. In other embodiments, at least some of the strips 234 of the fourth layer 230 and/or the strips 236 of the fifth layer 232 extend beyond the inner circumference 134 and/or the outer circumference 135 of the rim 122. In one embodiment, at least some of the strips 142 of the first layer 160, the strips 202 of the second layer 200, the strips 222 of the third layer 220, the strips 234 of the fourth layer 230, and/or the strips 236 of the fifth layer 232 extend partially around and partially form the spoke engaging portion 136, or extend around the spoke engaging portion 136 and at least partially form the spoke engaging portion 136 and the second sidewall of the rim 122. Alternatively or additionally, at least some of the strips 142 of the first layer 160, the strips 202 of the second layer 200, the strips 222 of the third layer 220, the strips 234 of the fourth layer 230, and/or the strips 236 of the fifth layer 232 at least partially form the tire engaging portion 130 and/or extend beyond the outer circumference 135 of the rim 122.

The layup pattern shown in FIGS. 12 and 13 (e.g., for the first sidewall 138 or the second sidewall) includes fewer strips 222 of the third layer 220, fewer strips 234 of the fourth layer 230, and fewer strips 236 of the fifth layer 232 than the number of strips 142 of the first layer 160 and the number of strips 202 of the second layer 200, respectively. For example, the first layer 160 includes 36 strips 142, the second layer 200 includes 36 strips 202, the third layer 220 includes 18 strips 222, the fourth layer 230 includes 18 strips 234, and the fifth layer 232 includes 18 strips 236. The first sidewall 138 and/or the second sidewall may include more or fewer strips 142 of the first layer 160, strips 202 of the second layer 200, strips 222 of the third layer 220, strips 234 of the fourth layer 230, and/or strips 236 of the fifth layer 232.

In the embodiment shown in FIGS. 12 and 13, the orientation angle α for each of the strips 142 of the first layer 160 is 60°, the orientation angle α for each of the strips 202 of the second layer 200 is −60°, and the orientation angle α for each of the strips 222 of the third layer 220 is 90°. The orientation angle α for each of the strips 234 of the fourth layer 230 is, for example, 80°, and the orientation angle α for each of the strips 236 of the fifth layer 232 is, for example, −80°. Other orientation angles α may be used for the strips 142, the strips 202, the strips 222, the strips 234, and/or the strips 236. In other embodiments, different subsets of the strips 142 of the first layer 160, different subsets of the strips 202 of the second layer 200, different subsets of the strips 222 of the third layer 220, different subsets of the strips 234 of the fourth layer 230, and/or different subsets of the strips 236 of the fifth layer 232 may have different orientation angles α, respectively.

The layup pattern for the strips 142, the strips 202, the strips 234, and the strips 236 may be a woven layup pattern on top of the third layer 220 of the composite material. For example, referring to FIG. 13, the first layer 160 includes the first strip 142a, the second strip 142b, and the third strip 142c, and the second layer 200 includes the fourth strip 202a, the fifth strip 202b, and the sixth strip 202c. The fourth layer 230 includes a seventh strip 234a and an eighth strip 234b, and the fifth layer 232 includes a ninth strip 236a and a tenth strip 236b. Each of the strips 142 of the first layer 160 of the composite material, including the first strip 142a, the second strip 142b, and the third strip 142c, includes the first end 204 and the second end 206 opposite the first end 204. Each of the strips 202 of the second layer 200 of the composite material, including the fourth strip 202a, the fifth strip 202b, and the sixth strip 202c, includes the first end 208 and the second end 210. Each of the strips 234 of the fourth layer 230 of the composite material, including the seventh strip 234a and the eighth strip 234b, has a first end 238 and a second end 240 opposite the first end 238, and each of the strips 236 of the fifth layer 232 of the composite material, including the ninth strip 236a and the tenth strip 236b, has a first end 242 and a second end 244.

As an example of the woven layup pattern, the first end 208 of the fourth strip 202a overlaps at least a portion of the first strip 142a at or adjacent to the first end 204 of the first strip 142a, and the second end 210 of the fourth strip 202a overlaps at least a portion of the third strip 142c at or adjacent to the second end 206 of the third strip 142c. The fourth strip 202a also overlaps a portion of the seventh strip 234a (e.g., including a portion at or adjacent to the first end 238 of the seventh strip 234a), a portion of the ninth strip 236a (e.g., including a portion at or adjacent to the second end 244 of the ninth strip 236a), and a portion (e.g., a middle portion) of the second strip 142b. The seventh strip 234a overlaps the second strip 142b at or adjacent to the second end 206 of the second strip 142, and the ninth strip 236a overlaps the second strip 142b at or adjacent to the first end 204 of the second strip 142b. The ninth strip 236a overlaps the seventh strip 234a at or adjacent to the first end 238 of the seventh strip 234a. The fifth strip 202b overlaps at least a portion of the second strip 142b at or adjacent to the first end 204 of the second strip 142b, and overlaps a portion (e.g., a middle portion) of the third strip 142c. The sixth strip 202c overlaps the third strip 142c at or adjacent to the first end 204 of the third strip 142c. The sixth strip 202c also overlaps the eighth strip 234b at or adjacent to the first end 238 of the eighth strip 234b, and overlaps the tenth strip 236b at or adjacent to the second end 244 of the tenth strip 236b. This pattern is repeated around, for example, the first sidewall 138 of the rim 122. The woven layup pattern of the strips 142, the strips 202, the strips 234, and the strips 236 is positioned on, for example, the third layer 220 (e.g., with the strips 222 positioned in line with the spokes 124 of the rim). The overlap of the third strip 142c by the fifth strip 202b is, for example, centered about one of the spokes 124, and thus, both the third strip 142c and fifth strip 202b overlap a respective one of the strips 222 of the third layer 220.

Different strips within different layers and/or different strips within a same layer may have different properties. For example, referring to FIGS. 12 and 13, the strips 222 of the third layer 220 are longer than all of the strips 142 of the first layer 160, all of the strips 222 of the second layer 220, all of the strips 234 of the fourth layer 230, and all of the strips 236 of the fifth layer 232. In other embodiments, subsets of strips (e.g., within different layers and/or within a single layer) may be longer than other strips, may be wider than other strips, may be different shapes than other strips, and/or may be made of a different material than other strips.

The layup pattern for the first sidewall 138 may be the same as the layup for the second sidewall. For example, the layup pattern for the first sidewall 138 and the second sidewall are as shown in FIGS. 3 and 5. Alternatively, the layup pattern for the first sidewall 138 may be different than the layup pattern for the second sidewall. The different layup patterns for the first sidewall 138 and the second sidewall, respectively, may be due to axial geometry from cassette clearance. For example, spokes 124 on one side of the wheel 54, 56 may be in higher tension and/or may approach the spoke engaging portion 136 of the rim 122 at different angles, respectively, than spokes 124 on the other side of the wheel 54, 56. For example, the layup pattern for the first sidewall 138 may be as shown in FIGS. 12 and 13, and the layup pattern for the second sidewall may be as shown in FIGS. 10 and 11. In one embodiment, at least some of the strips of the first sidewall 138 are of a different material than at least some of the strips of the second sidewall. Other combinations of layup patterns may be provided for the first sidewall 138 and the second sidewall, respectively.

The layup pattern for the first sidewall 138 and the second sidewall of the rim 122 of the front wheel 54 may be the same as the layup pattern for the first sidewall 138 and the second sidewall of the rim 122 of the rear wheel 56. Alternatively, the layup patterns for the front wheel 54 and the rear wheel 56, respectively, may be different. For example, the layup pattern for the first sidewall 138 and the second sidewall of the front wheel 54 may be as shown in FIGS. 3 and 5, and the layup pattern for the first sidewall 138 and the second sidewall of the rear wheel 56 may be as shown in FIGS. 12 and 13.

The layup pattern for the first sidewall 138 and/or the second sidewall of the front wheel 54 and/or the rear wheel 56 may be optimized for specific applications. For example, positioning of composite strips within a layup for a respective sidewall of a rim may be based on whether the sidewall is included in a front wheel or a rear wheel, whether the rim is subjected to wheel braking or rim braking, and/or whether the wheel is constructed using tangential lacing or radial lacing. The layup pattern may be optimized for additional and/or different applications.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A rim for a bicycle wheel, the rim comprising:
   a radially inner portion disposed along an inner circumference of the rim;
   a first sidewall;
   a second sidewall spaced apart from the first sidewall, wherein the first sidewall and the second sidewall extend radially outward from the radially inner portion and are formed of fiber reinforced materials throughout their entirety; and
   a radially outer tire engaging portion disposed along an outer circumference of the rim, the radially outer tire engaging portion extending from the first sidewall and the second sidewall, respectively,
   wherein the first sidewall includes a layer of a composite material, the layer of the composite material including strips of the composite material, the composite material including a matrix of a polymer-based material and fibers of a reinforcing material, and
   wherein the strips include a first strip and a second strip, the second strip being adjacent to the first strip within the layer of the composite material, the second strip being nonparallel to the first strip,
   wherein at least one of the first strip and the second strip have a finite length, the finite length being the length of the first sidewall plus an overhanging portion.

2. The rim of claim 1, wherein the polymer-based material is a plastic, an acrylic, a resin, an epoxy, or any combination thereof, and wherein the fibers of the reinforcing material are carbon fibers.

3. The rim of claim 1, wherein the fibers of each of the strips extend in a primary strength direction of the respective strip.

4. The rim of claim 3, wherein fiber orientation of the fibers of the respective strip is unidirectional in a direction along a length of the respective strip.

5. The rim of claim 1, wherein each of the strips has a length and a width, the width being perpendicular to the length, and
wherein the width of each of the strips is between 10 millimeters and 30 millimeters.

6. The rim of claim 1, wherein the layer of the composite material is a first layer of the composite material, and
wherein the second sidewall includes a second layer of the composite material or another composite material, the second layer of the composite material or the other composite material including fabric plies that are shaped as third strips,
wherein the third strips include a fifth strip and a fourth strip adjacent to the fifth strip, the fourth strip being nonparallel to the fifth strip.

7. The rim of claim 1, wherein the first strip is longer than the second strip, is wider than the second strip, or is longer and wider than the second strip.

8. The rim of claim 1, wherein each of the strips is at a different angle relative to a tangent of the outer circumference of the rim.

9. The rim of claim 1, wherein the strips extend beyond the inner circumference, the outer circumference, or the inner circumference and the outer circumference.

10. The rim of claim 1, wherein the strips extend around the radially inner portion, such that the second sidewall includes portions of the strips, respectively.

11. The rim of claim 1, wherein the strips are fully contained within the first sidewall.

12. The rim of claim 1, wherein the layer of the composite material is a first layer of material and the strips are first layer strips, and
wherein the first sidewall further includes a second layer of material, the second layer of material being a second composite material, the second layer of material including second layer strips of the second composite material.

13. A rim formed of a cured composite material, the rim comprising:
a radially inner portion disposed along an inner circumference of the rim;
a first sidewall;
a second sidewall spaced apart from the first sidewall, wherein the first sidewall and the second sidewall are formed of a fiber reinforced plastic composite material throughout their entirety, and extend radially outward from the radially inner portion; and
a radially outer tire engaging portion disposed along an outer circumference of the rim, the radially outer tire engaging portion extending from the first sidewall and the second sidewall, respectively,
wherein the first sidewall includes a plurality of first strips of the composite material, the composite material including a matrix of a polymer-based material and fibers of a reinforcing material, the fibers of each first strip of the plurality of first strips extending in a primary strength direction of the respective first strip, and wherein the second sidewall includes a plurality of second strips of the composite material, the fibers of each second strip of the plurality of second strips extending in a primary strength direction of the respective second strip,
wherein at least one of the first strip and the second strip have a finite length, the finite length being the length of the first sidewall plus an overhanging portion.

14. The rim of claim 13, wherein each first strip of the plurality of first strips has a length in the primary strength direction of the respective first strip, and each second strip of the plurality of second strips has a length in the primary strength direction of the respective second strip,
wherein each first strip of the plurality of first strips has a width perpendicular to a length of the respective first strip, the width of the respective first strip being between 10 millimeters and 30 millimeters, and
wherein each second strip of the plurality of second strips has a width perpendicular to a length of the respective second strip, the width of the respective second strip being between 10 millimeters and 30 millimeters.

15. The rim of claim 13, wherein a centerline of each first strip of the plurality of first strips is oriented at a first angle relative to a radial reference line extending from a center of the rim to the centerline of the respective first strip, and
wherein the first sidewall further includes a plurality of third strips, a centerline of each third strip of the plurality of third strips being oriented at a second angle relative to a radial reference line extending from the center of the rim to the centerline of the respective third strip, the second angle being different than the first angle.

16. The rim of claim 15, wherein the composite material is a first composite material,
wherein the plurality of third strips are made of a second composite material, the second composite material being different than the first composite material, and
wherein the plurality of first strips and the plurality of third strips are arranged about the center of the rim.

17. The rim of claim 15, wherein each first strip of the plurality of first strips overlaps portions of at least two respective third strips of the plurality of third strips, respectively, and each third strip of the plurality of third strips overlaps a portion of at least one first strip of the plurality of first strips, respectively.

18. A wheel for a bicycle, the wheel comprising:
a central hub configured for rotational attachment to the bicycle;
a plurality of spokes attached to the central hub and extending radially outward from the hub, the plurality of spokes consisting of a number of spokes; and
a rim comprising:
a radially inner portion disposed along an inner circumference of the rim, the plurality of spokes being attached to the radially inner portion of the rim,
a first sidewall;
a second sidewall spaced apart from the first sidewall, wherein the first sidewall and the second sidewall are formed of a fiber reinforced plastic material widths throughout their entirety, and extend radially outward from the radially inner portion; and
a radially outer tire engaging portion disposed along an outer circumference of the rim, the radially outer tire engaging portion extending from the first sidewall and the second sidewall, respectively,
wherein the first sidewall includes a layer of a composite material, the layer of the composite material including fabric plies of the composite material that are shaped as strips, the composite material including a matrix of a polymer-based material and fibers of a reinforcing material, and wherein the strips include a first strip and a second strip, the second strip being adjacent to the first strip within the layer of the composite material, the second strip being nonparallel to the first strip, wherein at least one of the first strip and the second strip have a finite length, the finite length being the length of the first sidewall plus an overhanging portion.

19. The rim of claim 1, wherein the overhanging portion extends only partially onto the second sidewall.

20. The rim of claim 19, wherein the overhanging portion is only long enough to extend around a spoke engaging portion of the rim.

\* \* \* \* \*